US011449860B2

(12) United States Patent
Gupta

(10) Patent No.: US 11,449,860 B2
(45) Date of Patent: Sep. 20, 2022

(54) SPECIALIZED KEYPAD FOR PRE-STAGING COMPLEX TRANSACTIONS

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/877,650

(22) Filed: May 19, 2020

(65) Prior Publication Data

US 2021/0365927 A1 Nov. 25, 2021

(51) Int. Cl.
*G06Q 20/00* (2012.01)
*G06Q 20/34* (2012.01)
*G06Q 20/38* (2012.01)
*G06Q 20/40* (2012.01)
*G06K 7/00* (2006.01)

(52) U.S. Cl.
CPC ......... *G06Q 20/352* (2013.01); *G06K 7/0065* (2013.01); *G06Q 20/382* (2013.01); *G06Q 20/4012* (2013.01)

(58) Field of Classification Search
CPC .................................................. G06Q 20/352
USPC .......................................................... 705/41
See application file for complete search history.

(56) References Cited

U.S. PATENT DOCUMENTS

| 9,864,944 | B2 | 1/2018 | Radu et al. | |
| 2007/0057038 | A1* | 3/2007 | Gannon | G06Q 20/3226 |
| | | | | 235/380 |
| 2008/0282540 | A1* | 11/2008 | Singleton | G06K 19/07724 |
| | | | | 29/856 |
| 2016/0371665 | A1* | 12/2016 | Lewis | G07F 19/203 |
| 2017/0357979 | A1* | 12/2017 | Khurana | H04L 63/102 |
| 2019/0286805 | A1 | 9/2019 | Law et al. | |
| 2021/0158332 | A1* | 5/2021 | Adari | G06Q 20/385 |

OTHER PUBLICATIONS

Secure Authentication for ATM transactions using NFC technology 2019 International Carnahan Conference on Security Technology (ICCST) (pp. 1-5) Authors: Divyans Mahansaria • Uttam Kumar Roy (Year: 2019).*
Cash withdrawal from ATM machine using Mobile banking 2016 International Conference on Computational Techniques in Information and Communication Technologies (ICCTICT) (pp. 535-539) Authors: Nischal Bansal • Nepali Singla (Year: 2016).*

* cited by examiner

*Primary Examiner* — Bruce I Ebersman
*Assistant Examiner* — John A Anderson
(74) *Attorney, Agent, or Firm* — Weiss & Arons LLP

(57) ABSTRACT

Wait times at ATMs may undermine the utility of these self-service machines. ATMs are configured to provide faster self-service kiosks that allow users to quickly perform common financial transactions. However, it has been increasing common for users to have to wait on a line to access an ATM. Apparatus and methods are provided for a smart card that stages transactions by capturing the amount, pin and other necessary information on the smart card itself, before the user begins interacting with the ATM. Information captured by the smart card may be transferred to ATM when the smart card is inserted into ATM. The user does not provide the ATM with any additional information after inserted the smart card into the ATM, thereby improving the transaction processing efficiency of the ATM and enhancing user satisfaction.

11 Claims, 10 Drawing Sheets

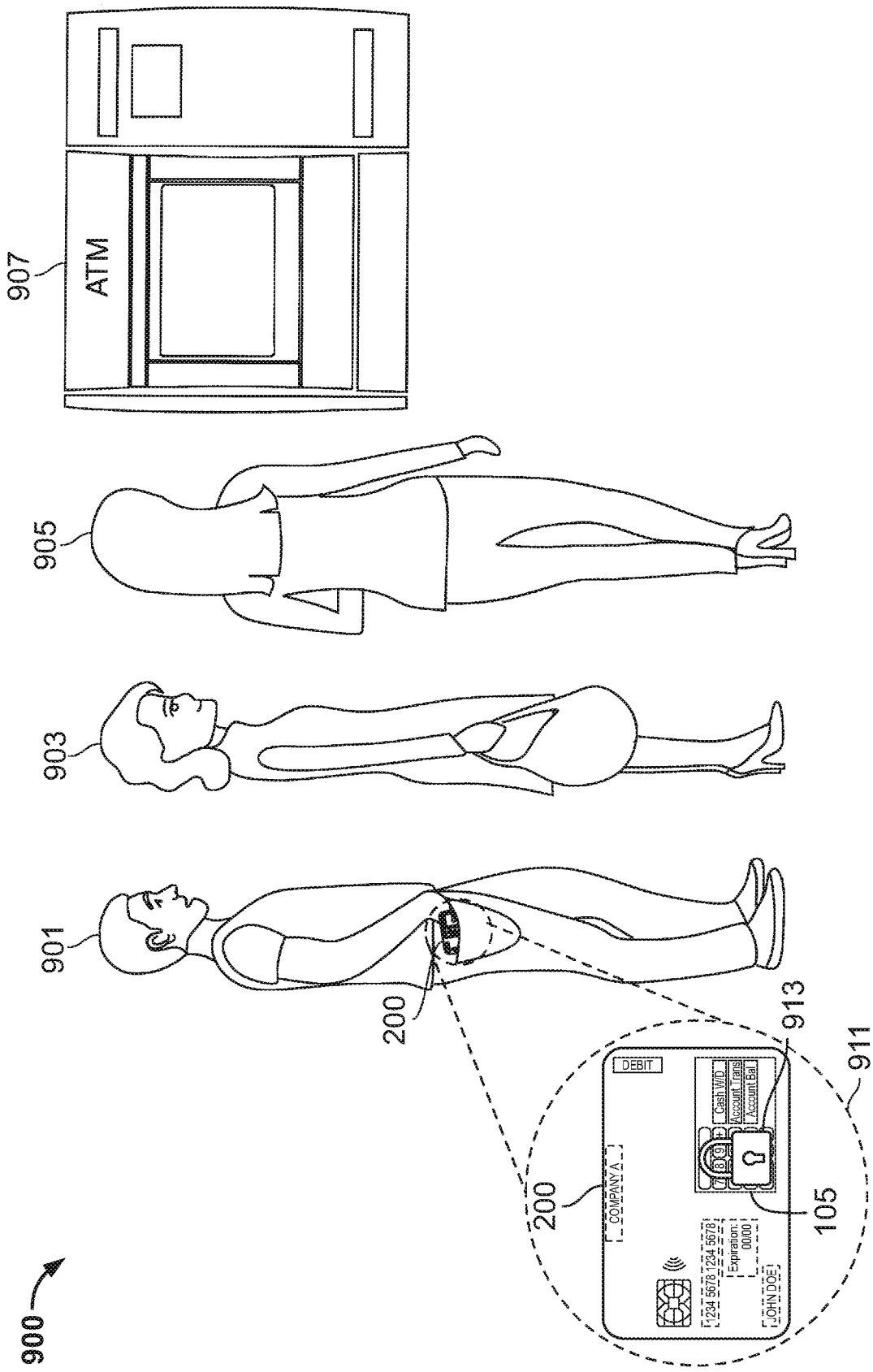

SPECIALIZED KEYPAD FOR PRE-STAGING COMPLEX TRANSACTIONS

FIELD OF TECHNOLOGY

Aspects of the disclosure relate to improving transaction efficiency and operation of automated teller machines ("ATMs").

BACKGROUND OF THE DISCLOSURE

Wait times at ATMs may detract from the utility of these self-service machines. ATMs are deployed to provide self-service kiosks that allow users to quickly perform common financial transactions. However, it has been increasing common for users to have to wait to access an ATM while other users complete their transactions at the ATM.

An ATM may be capable of processing a higher number of financial transactions per unit of time than a human teller. However, an ATM transaction typically requires numerous user inputs before a transaction may be initiated and completed. For example, the ATM may first require a user to insert a card, such as a debit card, into the ATM. The card may include account or other information that links the user to one or more financial accounts. Information stored on the card may include a unique identifier and username.

Based on the information stored on the card, the ATM may prompt the user to enter a personal identification number ("PIN") associated with the card. The PIN may be used to authenticate the user at the ATM. After authenticating the user, the ATM may then prompt for inputs such as amount of money, an account selection or other transaction details. The prompting for information by the ATM, and the subsequent entry of a response by the user, all increase an amount of time each user may spend at the ATM.

Others may need to wait while the user responds to the ATM prompts and completes their desired transaction. The lengthy wait time may increase user dissatisfaction and reduce a transaction efficiency of the ATM.

Some technology solutions exist for attempting to reduce the number of ATM prompts and user responses. However, these solutions typically require additional third-party hardware and services, such as a mobile device or laptop/desktop computer system. These solutions, in addition to increasing costs associated with obtaining the third-party hardware and services, also increase potential security risks. For example, a third-party device must be adequately secured to transmit and receive sensitive financial data. Communication between the third-party device and the ATM must also be secured. Furthermore, any sensitive financial data stored locally on the third-party device must be adequately secured to prevent unauthorized access to that data.

Accordingly, it would be desirable to reduce user wait-times at an ATM and improve the transaction efficiency of an ATM without relying on third-party hardware or services. It would be further desirable to improve the transaction efficiency of an ATM without imposing costs to procure and maintain third-party hardware or services. It would also be desirable to improve the transaction efficiency of an ATM without increasing security risks associated with third-party hardware and services.

Accordingly, it is desirable to provide apparatus and methods for a SPECIALIZED KEYPAD FOR PRE-STAGING COMPLEX TRANSACTIONS.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 9A shows an illustrative apparatus and scenario in accordance with principles of the disclosure;

DETAILED DESCRIPTION

Figure 1:
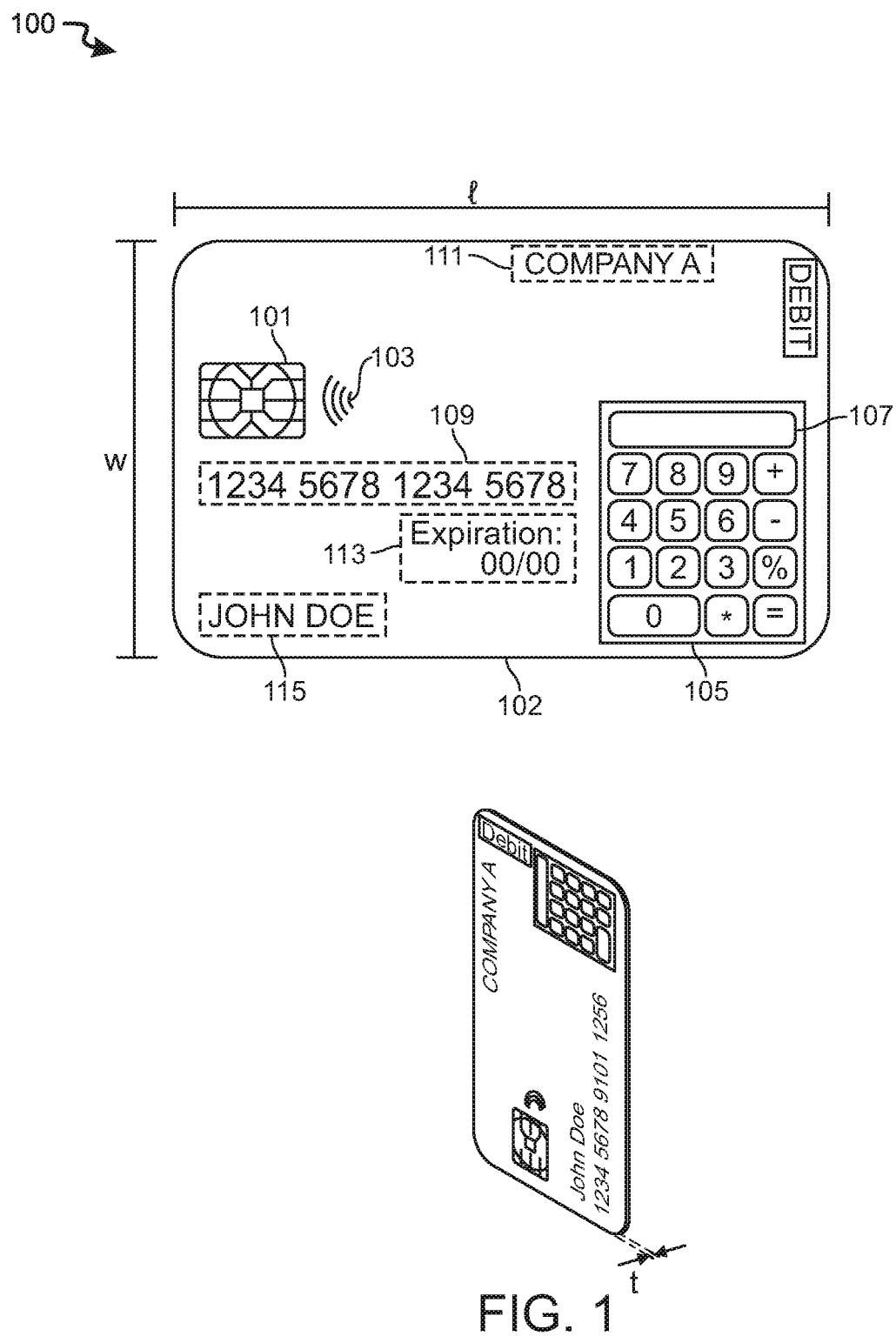
FIG. 1 shows illustrative apparatus in accordance with principles of the disclosure.

Apparatus for a smart card are provided. The smart card may improve transaction processing efficiency of an Automated Teller Machine ("ATM") or any other self-service kiosk.

The smart card may include a microprocessor. The smart card may include various other components, such as a battery, a speaker, and antennas. The microprocessor may have a thickness that is not greater than 0.25 millimeters ("mm"). The microprocessor may control overall operation of the smart card and its associated components. The smart card may include RAM, ROM, an input/output ("I/O") module and a non-transitory or non-volatile memory.

The I/O module may include a microphone which may accept user provided input. The I/O module may include one or more of a speaker for providing audio output and a display for providing textual, audiovisual and/or graphical output.

Software may be stored within the non-transitory memory and/or other storage media. The software may provide instructions to the microprocessor. The instructions may enable the smart card to perform various functions. For example, the non-transitory memory may store software used by the smart card, such as an operating system, application programs, web browser and a database. Alternatively, some or all of computer executable instructions of the smart card may be embodied in hardware or firmware components of the smart card.

Application programs, which may be used by the smart card, may include computer executable instructions for invoking user functionality related to communication, authentication services, and voice input and speech recognition applications. Application programs may utilize one or more algorithms that encrypt information, process received executable instructions, interact with an ATM, perform power management routines or other suitable tasks.

The smart card may include a pressure sensitive button. The pressure sensitive button may have a thickness that is not greater than 0.8 mm. The pressure sensitive button may be actuated by a user to activate the smart card. Actuation of the pressure sensitive button may provide an electronic signal to the microprocessor or any other component of the smart card. For example, actuating the pressure sensitive button may activate the microprocessor, a keypad or a communication interface of the smart card.

In some embodiments, the smart card may be activated in response to receiving high frequency wireless signals. The high frequency signals may be detected by the communication interface. The high frequency signals may be broadcast by an ATM. The high frequency signals may be generated by a near field communication ("NFC") reader. The high frequency signals may provide power to one or more components of the smart card. In some embodiments, in response to receiving the power, the microprocessor may be activated and begin to draw power from a battery of the smart card.

The smart card may operate in a networked environment. The smart card may support establishing communication channels with one or more ATMs. The smart card may connect to a local area network ("LAN"), a wide area network ("WAN") or any suitable network. When used in a LAN networking environment, the smart card may be connected to the LAN through a network interface or adapter. The communication interface may include the network interface or adapter.

When used in a WAN networking environment, the smart card may include a modem or other means for establishing communications over a WAN, such as the Internet. The communication interface may include the modem. It will be appreciated that the network connections shown are illustrative and other means of establishing a communications link between devices may be used. The existence of any of suitable communication protocols such as TCP/IP, Ethernet, FTP, HTTP and the like is presumed.

The smart card may be operational with numerous other general purpose or special purpose computing system environments or configurations. Examples of computing systems, environments, and/or configurations that may be suitable for use with the invention include, but are not limited to, personal computers, server computers, hand-held or laptop devices, tablets, mobile phones, multiprocessor systems, microprocessor-based systems, programmable consumer electronics, network PCs, minicomputers, mainframe computers, distributed computing environments that include any of the above systems or devices, and the like.

The smart card may utilize computer-executable instructions, such as program modules, being executed by a computer. Generally, program modules include routines, programs, objects, components, data structures, etc. that perform particular tasks or implement particular abstract data types. The smart card may be operational with distributed computing environments where tasks are performed by remote processing devices that are linked through a communications network. In a distributed computing environment, program modules may be located in both local and remote computer storage media.

The smart card may include one or more batteries. A battery of the smart card may be flexible. The battery may be a power source for electronic components of the smart card. For example, the battery may supply power to a keypad, a communication interface and the microprocessor. The battery may have a thickness that is not greater than 0.5 mm.

The smart card's power source may include high frequency signals received from an ATM or other network node. The smart card may be configured to utilize received high frequency signals to recharge the battery or provide power to other components of the smart card.

The smart card may include an electrical contact. An electrical contact may be constructed using any suitable material that conducts or transfers electricity. The smart card may include a plurality of electrical contacts. An electrical contact may be accessible on any suitable face of a housing of the smart card. The contact may be accessible through a thickness of the housing. The contact may be utilized to transfer electrical charge to the rechargeable battery when the smart card is inserted into an ATM card reader. For example, the battery may be recharged via an electrical contact when the smart card is inserted into a card reader of the ATM.

The smart card may include a communication interface. The communication interface may have a thickness that is not greater than 0.8 mm. The communication interface may include a circuitry for establishing electronic communication with an ATM. The communication interface may be configured to implement protocols for wireless communication. The communication interface may include a wireless circuit.

The wireless circuit may include software and/or hardware for establishing a wireless communication channel with an ATM. Such protocols may include Wi-Fi, Bluetooth, Ethernet, NFC and cellular telecommunications. Protocols may include passive Wi-Fi with lower power consumption than typical Wi-Fi.

The communication interface may include a Near Field Communication ("NFC") chip. The NFC chip may communicate over a typical NFC range (~2 in.) when transmitting or receiving sensitive data. An illustrative NFC chip may utilize a 13.56 MHz radio frequency.

A microprocessor of the smart card may be configured to dynamically limit or expand transmitting and/or receiving ranges. The microprocessor may dynamically limit or expand transmitting and receiving ranges in response to a detected location of the smart card.

For example, the microprocessor may expand a communication range when the smart card is within a "familiar" zone. Expanding a communication range may include using a Wi-Fi communication channel rather than an NFC communication channel. Expanding a communication range may include using a typical Wi-Fi range such as 150-300 ft. when searching for available ATM wireless communication channel and using passive Wi-Fi after establishing the communication channel with the ATM.

A familiar zone may be a pre-defined radius from a user's home or work location. The microprocessor may limit a communication range when the smart card is within an "unknown" zone. For example, the microprocessor may limit a communication range when the user is travelling. The microprocessor may restrict the smart card to using NFC or contact-based communication channels when operating in an unknown zone.

In some embodiments, the smart card may be activated in response to receiving wireless signals from the ATM. The wireless signals may provide power to one or more components of the smart card. Illustrative wireless signals may include NFC signals. For example, in response to receiving power via the wireless signals, a microprocessor of the smart card may be activated.

The smart card may include a battery for powering the communication interface and the microprocessor. The smart card may include an electrical contact that may be used to establish a wired or contact-based connection to the ATM.

An exemplary electrical contact may be an "EMV" chip. EMV is a technology that derives its name from the companies (Europay, MasterCard, and Visa) that helped develop the technology. When an EMV chip is inserted into a specialized card reader, the reader powers the EMV chip and the EMV chip generates a new authorization code each time it is used to authorize a transaction. Thus, simply copying information printed on the face of the smart card or encoded on a magnetic stripe may be insufficient to initiate a fraudulent transaction.

The EMV chip may function as an electrical contact. The EMV chip may include software and/or hardware for establishing a wired communication channel with the ATM. The battery of the smart card may be recharged when the smart card is in contact with the ATM via the EMV chip.

The smart card may include a housing. The housing may provide a protective layer for internal components of the smart card. The housing may be flexible. The housing may be constructed from plastic or other suitable materials. The housing may define a form factor of the smart card. The microprocessor and other components of the smart card may be embedded in, and protected by, the housing.

For example, an ATM may include a card reader constructed to receive a card that conforms to a predefined form factor. An illustrative form factor is defined in specifications published by the International Organization for Standardization ("ISO"). Illustrative specifications may include: ISO/IEC 7810, ISO/IEC 7811 and ISO/IEC 7816, which are hereby incorporated herein by reference in their respective entireties.

The smart card may include non-transitory memory locations within the housing. The microprocessor may access such memory locations. The non-transitory memory may be included in the microprocessor.

The non-transitory memory locations may store instructions, that when executed by the microprocessor, cause the smart card to perform various functions. For example, the microprocessor may instruct the communication interface to scan for a wired or wireless communication channel and connect to a detected ATM.

The smart card may include a keypad. The keypad may be mounted on an outside of the housing. The keypad may include mechanical keys. The housing of the smart card may conform to the predefined form factor. The keypad may not increase the form factor of the smart card required to insert the smart card into a ATM. For example, the housing and the keypad mounted on an outside of the housing may collectively have a thickness that is not greater than 0.8 mm. An entire surface area of the smart card, including the keypad, may not exceed 86 mm×54 mm.

The ATM may utilize information stored on the card to authenticate a user at the ATM. In addition to information stored on the card, the ATM may prompt the user for additional information before allowing the user to initiate a transaction at the ATM. The additional information may include a PIN or biometric feature.

After authenticating the user, the ATM may allow the user to initiate a transaction at the ATM. Illustrative transactions may include withdrawing cash, transferring funds between accounts or depositing cash/checks.

The keypad may include mechanical keys. A user of the smart card may enter data using the keypad. The data entered by the user may be captured by the microprocessor. The user may pre-enter data via the keypad that would typically be requested by the ATM when authenticating the user. The user may pre-enter data via the keypad that would typically be requested by the ATM to initiate a transaction on behalf of the user.

The keypad may allow the user to enter data that will be needed by the ATM before accessing the ATM. Entering the data before accessing the ATM may reduce an amount of time the user spends entering data after accessing the ATM. Reducing the amount of time the user spends entering data at the ATM may, in turn, reduce the amount of time other users spend waiting to access to the ATM. Reducing the amount of time each user spends entering data at the ATM may increase the number of transaction that the ATM may process per unit of time. Thus, reducing the amount of time any one user spends entering data at the ATM may increase the transaction processing efficiency of the ATM.

Data entered using the keypad may include authentication information that would typically be requested by an ATM before providing a user access to one or more services of the ATM. For example, using the keypad, the user may enter a PIN. Using a camera of the smart card, the user may submit a biometric feature into the smart card. The authentication information (e.g., PIN or biometric feature) may be encrypted and stored locally on the smart card. After capturing the authentication information, the smart card may present the authentication information to the ATM without requiring any further input from the user.

Data entered using the keypad may include transaction information that would typically be requested by an ATM before implementing one or more services of the ATM. For example, the user may enter an amount for a cash withdrawal using the keypad before reaching the ATM. The smart card may transmit the keyed-in withdrawal amount to the ATM without requiring any further input from the user. The smart card may instruct the ATM to execute the withdrawal transaction without requiring any further input from the user.

Other illustrative data that may be entered via the keypad may include a user's name, an expiration date of the smart card, an amount, a currency, a card verification value ("CVV") or any other suitable data. The user may enter information such as a telephone number, address or zip code. Such information may be used to authenticate the user and/or the smart card.

In some embodiments, data entered using the keypad may be transferred to an ATM when the smart card is inserted into or otherwise in communication with the ATM. In some embodiments, data entered using the keypad may be transferred to the ATM before the user inserts the smart card into the ATM.

The information transferred to the ATM by the smart card may be utilized by the ATM to complete transaction details that would have otherwise required prompting the user for inputs at the ATM. Capturing the data on the smart card before the user accesses the ATM reduces the amount of time a user needs to spend entering data at the ATM, thereby increasing the transaction processing efficiency of the ATM.

The smart card may include executable instructions. The executable instructions may be stored in a non-transitory memory. The executable instructions, when run by the microprocessor, may implement various functions of the smart card. The executable instructions may capture data entered using the keypad. The executable instructions may encrypt the captured data. The smart card may include a dedicated encryption controller for performing data encryption. The executable instructions may store the encrypted data locally on the smart card.

The executable instructions may formulate a set of transaction instructions executable by the ATM. Transaction instructions executable by the ATM may be formulated based on the data (e.g., transaction information) captured by the keypad. For example, the microprocessor may formulate transaction instructions for executing a transaction at the ATM. The microprocessor of the smart card may integrate the data captured from the keypad into the transaction instructions.

The smart card may transfer the transaction instructions to the ATM. The smart card may transfer the transaction instructions in response to establishing a communication channel with the ATM. The communication interface may be used to establish the communication channel. For example, the smart card may establish the communication channel when the smart card is inserted into a card reader of the ATM. The ATM may autonomously initiate a transaction based on transaction information or transaction instructions stored locally on the smart card, thereby improving the transaction processing efficiency of the ATM.

For example, using the keypad, the smart card may capture a PIN and a withdrawal amount from a user before the user approaches or otherwise accesses the ATM. The smart card may formulate a withdrawal request for the amount entered by the user. The smart card may formulate transaction instructions for implementing the withdrawal request before the user inserts the smart card into the ATM.

The smart card may include a communication interface that includes a wireless communication interface. The smart card may scan for a wireless communication channel broadcast by the ATM. The smart card may attempt to establish a connection to the ATM using the detected wireless communication channel. The smart card may establish the wireless communication channel to the ATM before the smart card is inserted into the ATM.

The wireless communication channel may only be used for transferring transaction instructions previously formulated by the smart card. In response to receiving transaction instructions from the smart card, the ATM may initiate pre-processing of the user's desired transaction.

Pre-processing may include verifying any authentication information included in the transaction instructions. Pre-processing may include verifying that the user has sufficient funds available to warrant dispensing cash to the user. Pre-processing may determine that further input is needed from the user before dispensing cash.

For example, a user's account or ATM location may be associated with a specific fraud-mitigating protocol. The fraud-mitigating protocol may require a user to provide additional authentication information or verify previously provided authentication information before the ATM executes transaction instructions received from the smart card.

The ATM may complete any pre-processing before the user approaches the ATM and inserts the smart card into the ATM. The ATM, in response to detecting that the smart card has been inserted into the ATM, may determine that it has already pre-processed transaction instructions received from the smart card. The ATM may then execute the transaction instructions and the corresponding transaction.

From a perspective of the user, a transaction may be executed in real time after the smart card is inserted into the ATM. For example, if the transaction instructions correspond to a withdrawal request, in response to inserting the smart card into the ATM, the ATM may provide the requested cash to the user, without having prompted the user for any additional inputs.

In some embodiments, transaction instructions formulated by the microprocessor and stored locally on the smart card may not be transferred to the ATM before the smart card is inserted into the ATM. Such embodiments may provide an additional layer of fraud-mitigation by reducing the possibility that the transaction instructions may be intercepted during wireless transmission to the ATM.

Transaction instructions may be transferred to an ATM using a contact-based communication channel, such as an EMV chip. When transaction instructions are received by the ATM, the ATM may verify any authentication information and execute the transaction instructions to implement the transaction requested by the user. In some embodiments, the smart card may transfer the authentication information to the ATM in response to an authentication request submitted by the ATM directly to the smart card.

In some embodiments, the smart card may capture authentication information from the user before the user approaches the ATM. The smart card may encrypt the authentication information and transfer the authentication information to the ATM. The ATM may therefore not prompt the user for authentication information after the smart card is inserted into the ATM. After the user inserts the smart card into the ATM, the smart card may interact directly with the ATM, without requiring any further authentication information from the user.

After the ATM authenticates the user and the inserted smart card, the smart card may then transfer the set of transaction instructions to the ATM. Transaction instructions may be formatted in a fashion that is understandable for processing by the ATM. The ATM may autonomously decrypt transaction instructions.

The ATM may autonomously execute a set of transaction instructions and initiate a withdrawal transaction based on the withdrawal amount previously entered by the user. Transaction instructions formulated by the microprocessor may be sufficient to execute the transaction without the ATM prompting the user for additional data. The ATM may provide the request amount of cash to the user without requiring the user to enter any information at the ATM after inserting the smart card into the ATM.

The smart card may encrypt selected data entered by the user. The ATM may decrypt data it receives from the smart card. The selected data may be less than all of the data associated with transaction instructions. For example, the smart card may only encrypt a PIN, biometric or other authentication information. The smart card may not encrypt an amount. The smart card may encrypt any data entered by the user via the keypad.

Limiting the amount of data that is encrypted by the smart card may allow the smart card to use less power to function. Using less power may improve the functionality of the smart card by extending its battery life and extending the time between battery charges.

Limiting the amount of data that is encrypted may improve functionality of the ATM. The ATM may only need to decrypt selected data and not an entire set of transaction instructions. This may speed up a response time of the ATM when processing transactions instructions received from the smart card. Limiting the amount of data that needs to be decrypted by the ATM may further increase the transaction processing efficiency of the ATM per unit of time.

The smart card may delete locally stored encrypted data after expiration of a pre-determined time period. The smart card may delete locally stored transaction instructions after expiration of a pre-determined time period.

The keypad of the smart card may have an inactive state. In the inactive state, the keypad may not capture data entered using the keypad. For example, in the inactive state, the microprocessor may not supply power to the keypad. In the inactive state, the microprocessor and associated executable instructions may not capture data entered using the keypad.

The keypad may have an active state. In the active state, the keypad may be capable of capturing data entered by a user. In the active state, the microprocessor may supply power to the keypad. In the active state, the microprocessor and associated executable instructions may capture and/or encrypt data entered by the user using the keypad.

The inactive state of the keypad may be a default state. When the keypad is in the inactive state, data entered using the keypad of the smart card is not captured by the microprocessor. This may prevent inadvertent data entry. The microprocessor may toggle the keypad between the inactive and active states. For example, the microprocessor may activate the keypad in response to establishing a communication channel with an ATM.

A system for increasing transaction processing efficiency of an Automated Teller Machine ("ATM") is provided. The system may include a smart card having a thickness not greater than 0.8 mm. The smart card may have a width not greater than 54 mm. The smart card may have a length not greater 86 mm.

The system may include a communication interface. The communication interface may be embedded in the smart card. The communication interface may include hardware and software for communicating with an ATM. For example, the smart card may include circuitry for communicating over Wi-Fi, NFC, Bluetooth, cellular, satellite or any suitable wireless network or protocol. The communication interface may include a wired communication interface. For example, the smart card may include circuitry and externally accessible electrical contact(s) for communicating over a wired Ethernet or any suitable wired network or protocol.

The system may include a microprocessor. The microprocessor may be embedded in the smart card. The microprocessor may control communication conducted using the communication interface. For example, the microprocessor may initiate communication with an ATM using the communication interface. The microprocessor may terminate communication with the ATM by turning off the communication interface. Turning off the communication interface may include disconnecting from the ATM. Turning off the communication interface may include terminating an ongoing communication session with the ATM. Turning off the communication interface may include cutting off power supplied to the communication interface.

The system may include a user input system. The user input system may be in electronic communication with the microprocessor. The user input system may include a keypad. The user input system may include an input controller. The input controller may capture data entered using the keypad. The user input system may include a voice controller. The voice controller may capture voice commands. The voice controller may generate an audio message confirming data captured by the input controller. The user input system may include an encryption controller. The encryption controller may encrypt data captured by the input controller and/or the voice controller.

The system may include machine executable instructions. The executable instructions may be stored in a non-transitory memory on the smart card. In some embodiments, the executable instructions may be stored in a non-transitory memory on the ATM. The executable instructions may be transferred to the smart card using a communication channel established using the communication interface of the smart card.

The executable instructions, when run by the microprocessor, may self-authenticate a user or the smart card to an ATM or other self-service kiosk. Self-authentication may be conducted over a communication channel established using the communication interface. The communication channel may be a secure communication channel linking the smart card and the ATM.

Self-authentication may include providing the ATM with authentication credentials stored locally on the smart card. The self-authentication process may not prompt the user or require any inputs from the user. Authentication credentials may include a PIN or a biometric feature. The authentication credentials may be provided by the user during a process of entering transaction information, before establishing the communication channel with the ATM.

In some embodiments, the user may be required to enter authentication credentials each time transaction information is entered into the smart card. In some embodiments, the smart card may only require the user to enter authentication credentials after expiration of a pre-determined time period. The ATM may be configured to verify authentication credentials provided by the smart card before executing transaction instructions received from the smart card.

The microprocessor may formulate transaction instructions executable by the ATM. The transaction instructions may be formulated based on encrypted data stored locally on the smart card. Transaction instructions may be transferred to the ATM over a secure communication channel linking the smart card and the ATM.

Transaction instructions may be formulated before a secure communication channel is established between the smart card and the ATM. For example, a user of the smart card may enter data using the keypad when the user is at home. While at home, the smart card may not be within a communication range of an ATM.

An ATM may only establish a secure communication link with the smart card when the smart card is within a threshold distance of the ATM. When the smart card is within the threshold distance, the smart card may be likely or expected to access the ATM. In some embodiments, the secure communication link may only be established when the smart card initiates a request to establish the secure communication link. In some embodiments, the secure communication link may only be established when the smart card establishes wired connection with the ATM.

Transaction information or instructions stored locally on the smart card may be used to stage a transaction at the ATM. A staged transaction may include all data needed to execute a transaction at the ATM without requiring further input from a user. For example, for a withdrawal transaction, transaction instructions may include a PIN, the amount to be withdrawn and the account funds are to be withdrawn from. When the ATM receives the transaction instructions from the smart card, the ATM may verify that the PIN is associated with the account. The ATM may also verify that the account includes sufficient funds to fulfill the withdrawal request.

After conducting the verification, the ATM may execute the transaction instructions. Thus, the user of the smart card may not need to input any additional information after the transaction instructions are transferred to the ATM.

In some embodiments, after conducting the verification of the PIN and sufficient funds, the ATM may await an instruction from the user before executing the transaction instructions. For example, the ATM may receive transaction instructions over a wireless communication channel. The ATM may receive the transaction instructions over the wireless communication when the smart card more than a threshold distance away from the ATM.

For example, user of the smart card may enter data used to formulate the transaction instructions when the user is at home or at work. The transaction instructions may be transmitted to the ATM over a Wi-Fi or cellular communication channel. The user may trigger execution of the transaction instructions by accessing an ATM and confirming the transaction at the ATM.

Transaction instructions may be transmitted from the smart card to a target ATM. The transaction instructions may be transmitted to a cloud computer system. When the smart card establishes a wired connection to the ATM, the ATM may check whether transaction instructions associated with the smart are stored in the cloud computing system.

In some embodiments, after storing transaction instructions locally on the smart card, a flag may be set on the smart card. The ATM may be configured to check the flag and determine whether transaction instructions for a staged transaction have been generated by the smart card.

In some embodiments, the ATM may require authentication before establishing a wired connection with the smart card. For example, the ATM may require entry of the PIN or submission of a biometric feature before executing transaction instructions.

Transaction instructions formulated by the smart card may reduce the number of user inputs required at the ATM. Reducing the number of user inputs at the ATM improves the transaction processing efficiency of the ATM.

The microprocessor may configure the smart card to purge locally stored transaction instructions when an ATM does not establish a wired or contact-based communication channel with the smart card within a pre-determined time period.

A cloud computing system may receive transaction instructions at a first time. When an ATM accessible to the cloud computing system does not establish a wired connection to the smart card by a second time, the cloud computing system may purge the transaction instructions. In some embodiments, the interval between the first and second times may be set by the cloud computing system. The cloud computing system may assign a default interval to transaction instructions received from the smart card.

The cloud computing interval may assign a longer or shorter time interval based on a distance between a location of the smart card transmitting the transaction instructions and a location of an ATM. The system may use a machine leaning algorithm to determine an appropriate interval that provides sufficient time for the smart card user to travel to the ATM.

The machine learning algorithm may take account of traffic patterns, time of day and typical user behavior. For example, if transaction instructions are received at the end of a workday, the interval may be shorter than if the transactions instructions are received earlier in the workday.

The system may include a front controller. The front controller may be included in the ATM. Using an ATM communication channel, the front controller may receive encrypted input data from the smart card via the communication interface. The encrypted data may include transaction instructions. The transaction instructions may be received by the front controller from a cloud computing system.

The system may include a decryption controller. The decryption controller may be included in the ATM. The decryption controller may decrypt encrypted data received by the ATM from the smart card.

The system may include an input validation controller. The input validation controller may communicate with a remote computer server. The remote computer server may be a cloud computing system. The remote computer server may validate the encrypted data received from the smart card. Validating the encrypted data may include verifying whether transaction instructions received from the smart card are associated with a valid PIN or other valid authentication information. Validating the encrypted data may include verifying whether transaction instructions are associated with sufficient funds for a specified account.

The system may include a payment dispatcher. The payment dispatcher may be included in the ATM. The payment dispatcher may dispense cash or other items in response to a positive validation response received from the input validation controller.

The smart card may include a wireless communication interface. The executable instructions stored in a non-transitory memory may scan for a wireless ATM communication channel. An ATM wireless communication channel may only be detectable when the smart card is within a threshold distance of an ATM. For example, the ATM wireless communication channel may be purposefully configured to have a maximum transmission range that is limited to a threshold distance from the ATM.

In response to detecting the wireless ATM communication channel, the smart card may transfer encrypted data to the ATM over the wireless ATM communication channel. The ATM may stage a transaction based on transaction instructions included in the received encrypted data. The ATM may execute the staged transaction only after establishing contact-based communication with the smart card.

The microprocessor may purge encrypted data stored on the smart card when contact-based communication with the ATM is not established within a pre-determined time period. The ATM may purge transaction instructions received from the smart card when contact-based communication is not established with the smart card within a pre-determined time period.

The keypad may include a special purpose key. The special purpose key may be a pressure sensitive button. The microprocessor may capture data entered using the keypad, including actuation of the special purpose key. The entered data may be encrypted. The microprocessor may formulate target transaction instructions that are executable by the ATM. The target transaction instructions may be formulated based on the captured data. The target transaction instructions may be formulated to trigger execution of a transaction (e.g., when transferred to an ATM) corresponding to the actuated special purpose key.

For example, actuation of the special purpose key may formulate target transaction instructions corresponding to an account transfer transaction. An account transfer may move funds from a source account to a destination account. The target transaction instructions, when received by the ATM, may instruct the ATM to autonomously execute the account transfer. Autonomously execution of transaction instructions may refer to execution of a transaction without prompting a user for transaction details or information.

The target transaction instructions may be formulated based on input data keyed by the user using the keypad before actuating the special purpose key. For example, the account transfer transaction may use input data keyed by the user using the keypad after actuating the special purpose key. The target transaction instructions may be formulated based on input data keyed in by the user using the keypad within a threshold interval of actuating the special purpose key. All inputs keyed-in by the user may be encrypted.

Illustrative inputs that may be keyed-in by the user for an account transfer transaction may include a personal identification number ("PIN") associated with the smart card. The PIN may provide an authenticating credential to the ATM. The ATM may require at least one authentication credential before autonomously executing transaction instructions received from the smart card. For example, after receiving transaction instructions that include the PIN, the ATM may check with a remote computer system whether the PIN is validly associated with the smart card providing the PIN.

Illustrative inputs that may be keyed-in by the user for an account transfer transaction may include a transfer amount. Illustrative inputs that may be keyed-in by the user for an account transfer transaction may include a source account. Illustrative inputs that may be keyed-in by the user for an account transfer transaction may include a destination account. The source account may be an account funds will be removed from. The destination account may be an account that will receive the funds removed from source account.

In some embodiments, the smart card may assign a default source or destination account. A default account may be assigned based on a frequency a user account is used (as source or destination). A user may set the default account(s).

Actuation of the special purpose key may formulate target transaction instructions corresponding to a bill payment transaction. Illustrative data inputs that may be entered using the keypad and encrypted by the microprocessor in connection with a bill payment transaction may include a PIN associated with the smart card, a payment amount, an invoice number, a destination vendor and/or a payment source account.

In response to actuation of a special purpose key corresponding to a bill payment transaction, the microprocessor may formulate target transaction instructions that, when received by an ATM, autonomously initiates a transfer of the payment amount from the source account to the destination vendor for the invoice number.

Actuation of the special purpose key may formulate a target set of transaction instructions corresponding to a check deposit. Actuation of the special purpose key may activate a check reader. The check reader may include a camera or other image capturing device that is configured to capture an image of a paper check. Illustrative data inputs that may be entered using the keypad and encrypted by the microprocessor in connection with a check deposit transaction may include a PIN associated with the smart card, an account number printed on the paper check and/or a destination account.

In response to actuation of a special purpose key corresponding to a check deposit transaction, the microprocessor may formulate target transaction instructions that, when received by an ATM, autonomously initiates a transfer of the payment amount from the account number printed on the paper check to a specified destination account.

The smart card may include multiple special purpose keys. Each special purpose key may correspond to a different transaction. In some embodiments, the smart card may be configurable so that the user may assign a desired transaction to a special purpose key.

A special purpose key may include a display screen. The display screen may include organic light emitting diode ("OLED") technology. The OLED display may have a thickness that is not greater than 0.25 mm. OLEDs may be flexible. The microprocessor may configure the OLED display to present a label describing a transaction assigned to the special purpose key by the system or user.

OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment. Furthermore, OLEDs may be used to construct a display that consumes less power compared to other display technologies.

In response to establishing a communication channel with the ATM using the communication interface, the smart card may transfer the target transaction instructions to the ATM. When received by the ATM, the target transaction instructions autonomously trigger execution of the transaction corresponding to the special purpose key actuated in connection with transaction information entered by the user.

In some embodiments, the smart card may trigger execution of the target transaction instructions by wirelessly transferring the target transaction instructions to the ATM. In some embodiments, the communication interface may include at least one electrical contact for establishing a contact-based communication channel with the ATM.

The microprocessor may autonomously trigger execution of target transaction instructions at the ATM in response to establishing a contact-based communication channel with the ATM. Thus, the user may be required to physically insert the smart card into a card reader of the ATM to trigger execution of target transaction instructions formulated by the smart card.

Whether target transaction instructions are transferred to an ATM via contact-based or wireless communication channels, any such transfer may autonomously trigger execution of the target transaction instructions at the ATM without the ATM prompting for any additional data inputs. Automated triggering of transactions at the ATM without requiring user inputs at the ATM improves the transaction processing efficiency of the ATM.

The communication interface may have an inactive state. In the inactive state, the communication interface is unable to transmit data. The communication interface may include an active state. In the active state, the communication interface is capable of transmitting data. The microprocessor may toggle the communication interface from the inactive state to the active state. The microprocessor may toggle the communication interface from the active state to the inactive state.

For example, the microprocessor may toggle the communication interface from the inactive state to the active state in response to actuation of the special purpose key. The microprocessor may toggle the communication interface from the active state to the inactive state in response to actuation of the special purpose key.

A system for improving transaction processing efficiency of an ATM is provided. The system may include a smart card having a thickness not greater than 0.8 mm and a surface area not greater than 86 mm×54 mm. The smart card may include a communication interface, a microprocessor and a user input system. The user input system may be in electronic communication with the microprocessor.

The user input system may include a keypad. The keypad may include a first special purpose key. The keypad may include a second special purpose key. The input controller may capture data entered using the keypad. The entered data may include actuation of the first special purpose key.

Actuation of the first special purpose key may signal the microprocessor to formulate transaction instructions. The formulated transaction instructions may, when received by an ATM, autonomously trigger execution of a target transaction. Exemplary target transactions may include a cash withdrawal, account transaction and/or check deposit. Actuation of the second special purpose key may trigger a transfer of the formulated transaction instructions to the ATM.

The smart card may include a voice controller. In response to actuation of the first special purpose key, the voice controller may generate an audio message. The audio message may confirm formulation (by the microprocessor) of transaction instructions corresponding to the first special purpose key. The smart card may be configured to await confirmation of the audio message before transferring transaction instructions to the ATM.

The smart card may include an encryption controller. The encryption controller may encrypt data captured by the input controller. The encryption controller may encrypt transaction instructions and audio messages.

The smart card may include executable instructions stored in a non-transitory memory. The executable instructions may be triggered in response to actuation of the second special purpose key. In response to actuation of the second special purpose key, the executable instructions may establish a secure communication link with the ATM using the communication interface. In response to actuation of the second special purpose key, the executable instructions may authenticate the smart card to the ATM over the secure communication channel.

In response to actuation of the second special purpose key, the microprocessor may transfer a target transaction (as formulated in transaction instructions) from the smart card to the ATM over the secure communication channel. The transaction instructions, when received by the ATM may autonomously trigger execution of the target transaction at the ATM. Automated triggering of transactions at the ATM without requiring user inputs at the ATM improves the transaction processing efficiency of the ATM.

The executable instructions, when run by the microprocessor may formulate target transaction instructions based on a sequence of actuations of the first special purpose key. The sequence may be evaluated based on the number of actuations within a predetermined time interval. An illustrative time interval may be any interval between 150-500 milliseconds ("ms").

For example, one actuation of the first special purpose key within the predetermined interval may generate transaction instructions corresponding to a cash withdrawal. Two actuations of the first special purpose key within the predetermined interval may generate transaction instructions corresponding to an account transfer. Three actuations of the first special purpose key within the predetermined interval may generate transaction instructions corresponding to a bill payment.

The executable instructions, when run by the microprocessor may formulate target transaction instructions in response to detecting a long-press of the first special purpose key. A long press may be detected when the special purpose key is actuated for between 500-1,000 ms. For example, the microprocessor may formulate target transaction instructions corresponding to an account balance transaction in response to detecting a long-press of the first special purpose key.

Target transaction instructions may be first target transaction instructions. In response to detecting a second actuation of the first special purpose key, the executable instructions when run by the microprocessor may capture data entered using the keypad and formulate second target transaction instructions. After formulating the first and second target transaction instructions, the smart card may be configured to sequentially trigger, at an ATM, transactions corresponding to the first and second transaction instructions.

The first and second actuations of the first special purpose key may be measured based on a predetermined time interval. An illustrative time interval may be any interval between 150-500 milliseconds ("ms"). For example, the second target transaction instructions may be formulated when the microprocessor detects a second actuation of the first special purpose after expiration of the pre-determined time interval.

The second transaction instructions may be configured to execute a transaction based on a result effected by the first transaction instructions. For example, the first transaction instructions may trigger an account transfer. The second transaction instructions, executed sequentially after the first transaction instructions, may trigger a bill payment transaction. The bill payment transaction may utilize funds now present in the destination account as a result of the prior account transfer transaction.

The microprocessor may delete the second target transaction from the smart card when the first target transaction is not executed or transferred to an ATM within a pre-determined time period.

The communication interface may include a wireless communication circuit and a contact-based communication circuit. The executable instructions, when run by the microprocessor may scan for a wireless ATM communication channel. In response to detecting the wireless ATM communication channel, the smart card may transfer the first target transaction to the ATM over the wireless ATM communication channel. The transfer of the first target transaction to the ATM may trigger execution of a first target transaction at the ATM.

The smart card may only transfer the second transaction instructions to the ATM (and thereby trigger execution of second target transaction) after establishing a contact-based communication channel with the ATM. The smart card may be configured to transfer the first transaction instructions to a first ATM and trigger execution of a first transaction at the first ATM. The first transaction instructions may be transferred to the ATM wirelessly. The first ATM may be located in a familiar zone.

The smart card may be configured to transfer the second transaction instructions to a second ATM and trigger execution of a second transaction at the second ATM. The smart card may only trigger execution of the second target transaction at the second ATM after successful execution of the first target transaction at the first ATM. The confirmation of successful execution of the first transaction may be provided by the first ATM, the second ATM or another computer system.

The second transaction instructions may be transferred to the ATM using a contact-based communication channel. The second ATM may be located in an unknown zone. The second transaction may involve a threshold amount of funds, and therefore require the added security of ATM communication via a contact-based communication channel.

Methods for improving transaction processing efficiency of an ATM are provided. Methods may include capturing keystrokes from a keypad embedded in a smart card. The keypad may include at least one special purpose key. Methods may include encrypting the captured keystrokes.

Based on the captured keystrokes and actuation of the special purpose key, methods may include formulating target transaction instructions. Methods may include storing the target transaction instructions locally in a secure memory location on the smart card. In response to establishing a secure communication channel with the ATM, methods may include transferring the target transaction instructions from the secure memory location to the ATM.

The transferring of the target transaction instructions from the secure memory location to the ATM may trigger execution of the target transaction at the ATM. The transfer of the target transaction instructions may trigger execution of the target transaction at the ATM without the ATM prompting or receiving any input from a user of the smart card after receiving the target transaction instructions from the smart card.

Methods may include determining a target transaction type based on the actuation of the at least one special purpose key. Target transaction instructions may be formulated based on a number of times the special purpose key is actuated within a predetermined time interval. The number of times may correspond to a target transaction. The target transaction associated with the special purpose key may be system or user defined.

Target transaction instructions may also be formulated based on a duration of time the special purpose key is pressed or actuated by a user. Target transaction instructions may be formulated based on whether another key on the keypad is actuated concurrently with the special purpose key. Methods may include generating and/or playing audio confirmation of the target transaction instructions formulated by the smart card based on actuation of the special purpose key.

Methods for improving transaction processing efficiency of an Automated Teller Machine ("ATM") are provided. Methods may include capturing transaction information using a keypad embedded in a smart card. Methods may include formulating transaction instructions based on the transaction information captured via the keypad.

Methods may include encrypting the transaction information. Methods may include storing the encrypted transaction information locally on the smart card. Methods may include encrypting the transaction instructions. Methods may include storing the encrypted transaction instructions locally on the smart card.

Methods may include transferring the encrypted transaction instructions from the smart card to an ATM. Methods may include formulating a staged transaction at the ATM based on the encrypted transaction information. The staged transaction may include information needed for the ATM to execute a transaction autonomously, without requiring additional user input. Methods may include executing the staged transaction without receiving any input from a user of the smart card after transferring transaction instructions from the smart card to the ATM.

In some embodiments, the smart card may encrypt transaction information entered by a user. Methods may include providing audio confirmation to the user of the smart card. The audio confirmation may provide an audible articulation of the transaction instructions stored locally on the smart card.

Methods may include transferring transaction instructions from the smart card to the ATM using a contact-based communication channel. Methods may include transferring transaction instructions from the smart card to the ATM using a wireless communication channel.

The smart card may transmit transaction information to the ATM. The ATM may formulate transaction instructions based on the encrypted transaction information received from the smart card.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative smart card 100. Smart card 100 includes keypad 105. Keypad 105 may be used by a user of smart card 100 to enter information. Exemplary information may include an amount of cash the user wishes to withdraw from an ATM. The information may include a time or a time window when the user would like to withdraw the cash from the ATM.

For example, using keypad 105, the user may enter "100." This information may represent an amount of funds (e.g., $100) the user wishes to withdraw from an ATM. A currency of the funds may be automatically assigned based on a current location of smart card 100. A currency of the funds may be automatically assigned based on a location of an ATM. In some embodiments, keypad 105 may include denomination keys for specifying a denomination of the funds. Keypad 105 may include denomination keys for various currency denominations, such as dollars ($), euros (€), yen (¥), pounds (£) or any suitable currency.

The user may also enter "1530." This information may represent that the user wishes to withdraw the $100 after 2:30 pm. When the user specifies a time, the ATM that receives transaction instructions form the smart card may not allow withdrawal of the $100 before 2:30 pm. In some embodiments, the user may not specify any time. Not specifying any time may indicate that the user wishes to be able to withdraw the funds at any time.

In some embodiments, the user may enter a time window. For example, the user may enter "1530-1430." This may indicate that the user only authorizes withdrawal of the $100 during between 2:30 pm and 4:30 μm. The ATM may not allow withdrawal of $100 before 2:30 μm. The ATM may not allow execution of the withdrawal of $100 after 4:30 pm. For example, smart card 100 may purge the information associated with the stored withdrawal transaction after 4:30 pm. Smart card 100 may not transfer the transaction instructions to an ATM before 2:30 pm or after 4:30 pm. Smart card 100 may also purge transaction instructions after they have been transferred to an ATM.

Smart card 100 includes a microprocessor and other components for capturing, encrypting and storing information entered by a user. Smart card 100 also includes executable instructions for formulating transaction information entered via keypad 105 into transaction instructions that may be transferred to an ATM.

FIG. 1 shows that smart card 100 includes chip 101. Chip 101 may provide an electrical contact that is accessible through housing 102. Chip 101 may provide an electrical contact for establishing a wired or contact based communication channel with an ATM when card 100 is inserted into a card reader of the ATM. Chip 101 may be an EMV chip.

Chip 101 may store a copy of information printed on a face of smart card 100. For example, chip 101 may store card number 109, username 115, expiration date 113 and issuing bank 111. Chip 101 may also store encrypted security information. The encrypted security information may be utilized to provide a "second factor" method of authentication prior to executing a staged transaction.

For example, smart card 100 may package information entered by user 115 via keypad 105 into transaction instructions. The staged transaction instructions may include a PIN associated with smart card 100. The staged transaction instructions may be executable by an ATM without requiring any further input from user 115. Transaction instructions may be transferred from smart card 100 to the ATM using wireless circuitry 103. In some embodiments, transaction instructions may be transferred to the ATM via contact with chip 101.

After an ATM receives transaction instructions, the ATM may first determine whether a PIN included in the transaction instructions is associated with smart card 100. For example, the ATM may communicate with a remote server and determine whether the received PIN is validly associated with username 115 and/or card number 109.

As a second factor method of authentication, the ATM may determine whether the PIN included in the transaction instructions (and transferred to the ATM) successfully unlocks encrypted security information stored on chip 101. In the PIN successfully unlocks the encrypted security information, the ATM may execute transaction instructions received from smart card 100.

FIG. 1 also shows that smart card 100 has width w and length 1. Smart card 100 may be any suitable size. For example, width w may be 53.98 millimeters ("mm"). Length 1 may be 85.60 mm. Smart card 100 has a thickness t. An illustrative thickness may be 0.8 mm. An exemplary form factor of smart card 100 may be 53.98 mm×85.60 mm×0.8 mm. This exemplary form factor may allow smart card 100 to fit into a user's wallet or pocket. This exemplary form factor may allow smart card 100 to fit into a card reader of an ATM.

Figure 2:
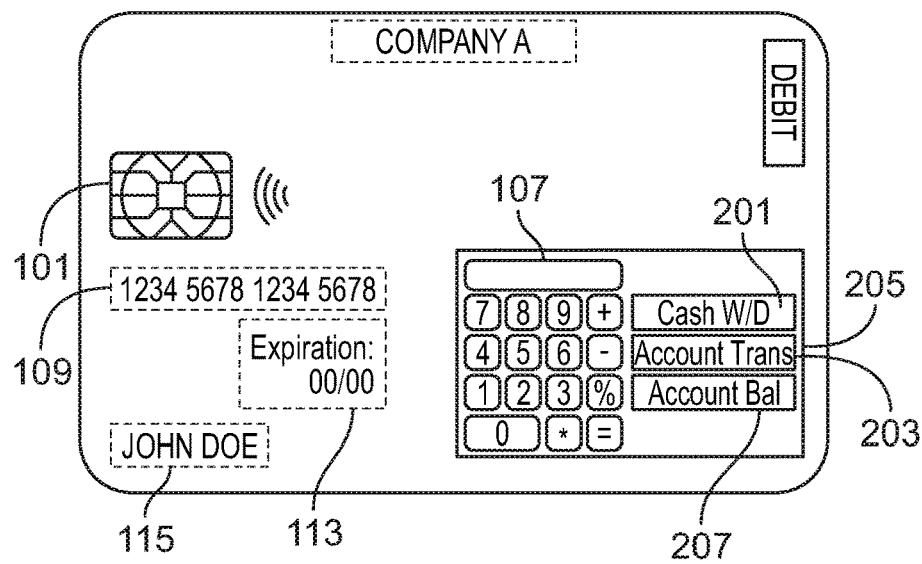
FIG. 2 shows an illustrative apparatus in accordance with principles of the disclosure.

FIG. 2 shows illustrative smart card 200. Smart card 200 may include one or more features of smart card 100 (shown in FIG. 1). For example, smart card 200 may have the same form factor (e.g., w, l and t) as smart card 100. Smart card 200 includes keypad 205. Keypad 205 may include one or more features of keypad 105 (shown in FIG. 1).

Keypad 205 includes special purpose key 201. Special purpose key 201 may be actuated by a user of smart card 200 to initiate a target transaction such as a cash withdrawal transaction. For example, actuation of special purpose key 201 may activate an input controller of smart card 200. When activated, the input controller may capture and encrypt data entered using keypad 205. The microcontroller may prompt the user to enter transaction information needed to formulate the transaction instructions. For a cash withdrawal transaction such transaction information may include amount, account, denomination (of bills or currency) and time restrictions. The microprocessor of smart card 200 may formulate transaction instructions corresponding to a cash withdrawal transaction based on the data entered using keypad 205.

In some embodiments, the input controller may first capture and encrypt transaction information entered using keypad 205. After entering the transaction information, the user may actuate special purpose key 201. In response to actuation of special purpose key 201, the microprocessor of smart card 200 may formulate transaction instructions corresponding to a cash withdrawal transaction based on the transaction information entered using keypad 205.

Keypad 205 also includes special purpose key 203. Special purpose key 203 may be actuated by a user of smart card 200 to initiate an account transfer transaction. Keypad 205 also includes special purpose key 207. Special purpose key 207 may be actuated by a user of smart card 200 to initiate a request for a current account balance. Transaction information needed for account transfer or account balance transactions may be entered using keypad 205.

Transaction information entered using keypad 205 may displayed on screen 107. Screen 107 may display messages to a user of smart card 200. For example, when special purpose key 207 is actuated, the current account balance may be displayed on screen 107.

Screen 107 may display a prompt for the user to enter authentication credentials or transaction information items. Screen 107 may display a prompt for the user to enter authentication credentials before formulating transaction instruction and/or before transmitting transaction instructions to an ATM. Illustrative authentication credentials may include a PIN or biometric information. Screen 107 may also display confirmation that transaction instructions have been successfully transmitted or executed by an ATM.

In some embodiments, screen 107 may itself be a special purpose key that may be actuated by a user. For example, screen 107 may include OLED technology. The microprocessor may configure the OLED display to present a label describing a transaction or other functionality assigned to screen 107.

Figure 3:
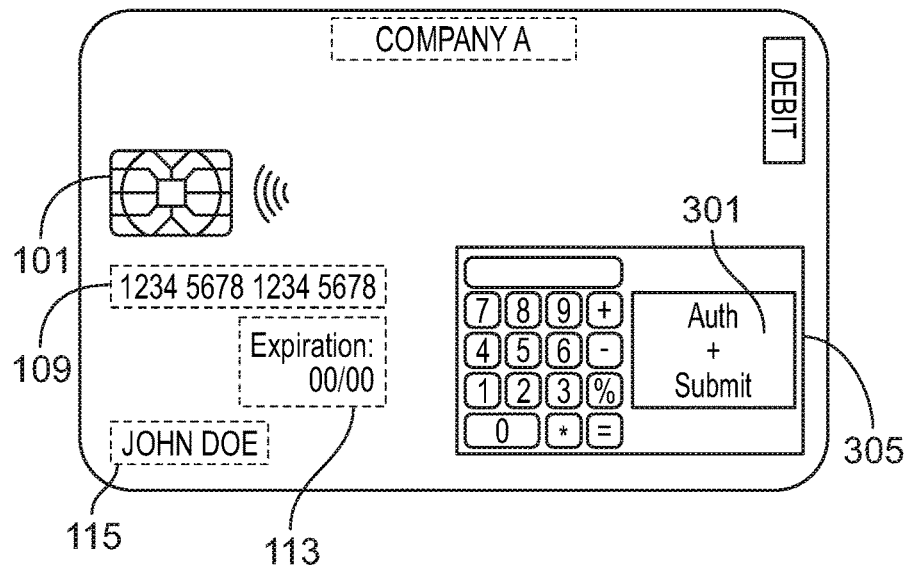
FIG. 3 shows an illustrative apparatus in accordance with principles of the disclosure.

FIG. 3 shows illustrative smart card 300. Smart card 300 may include one or more features of smart card 100 (shown in FIG. 1) and smart card 200 (shown in FIG. 2). Smart card 300 includes keypad 305. Keypad 305 may include one or more features of keypad 105 (shown in FIG. 1) and keypad 205 (shown in FIG. 2).

Keypad 305 includes special purpose key 301. Special purpose key 301 may be actuated by a user of smart card 300 to authorize a transaction and submit transaction instructions formulated by the microprocessor to an ATM. For example, after capturing input transaction information entered using keypad 305, smart card 300 may generate an audio message describing the transaction requested by the user, as understood by the microprocessor of smart card 300. The user may actuate special purpose key 301 to confirm the contents of the audio message and authorize transmission of the formulated transaction instructions to an ATM.

After receiving confirmation, using its communication interface, smart card 300 may then search for an ATM communication channel. After discovering an ATM communication channel, smart card 300 may submit the transaction instructions to the ATM and trigger autonomous execution of the authorized transaction. For example, after receiving confirmation and authorization for a transaction by actuation of special purpose key 301, smart card 300 may autonomously transfer formulated transaction instructions to an ATM when smart card 300 establishes a contact-based communication channel with the ATM.

Figure 4:
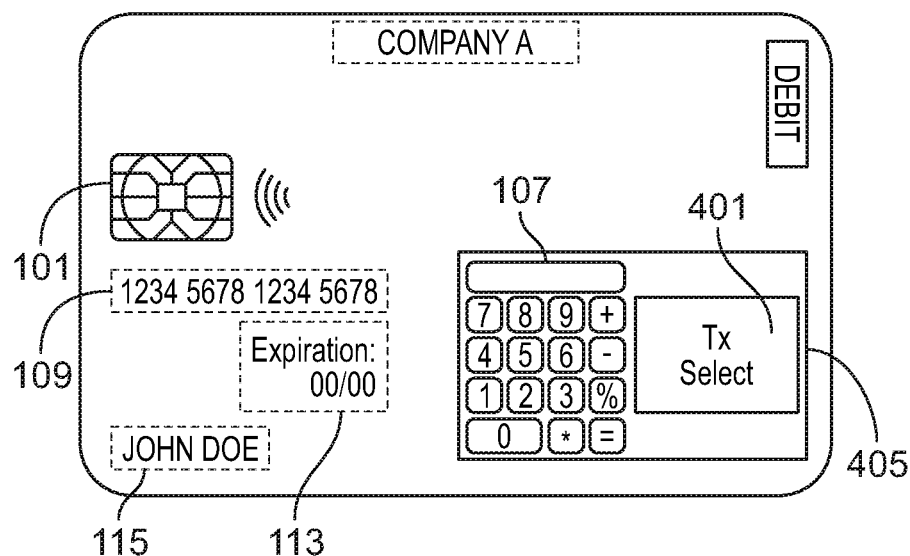
FIG. 4 shows an illustrative apparatus in accordance with principles of the disclosure.

FIG. 4 illustrative smart card 400. Smart card 300 may include one or more features of smart cards 100, 200 and 300 (shown in FIGS. 1, 2 and 3). Smart card 400 includes keypad 405. Keypad 405 may include one or more features of keypads 105, 205 and 305 (shown in FIGS. 1, 2 and 3).

Keypad 405 includes special purpose key 401. Special purpose key 401 may be actuated by a user of smart card 400 to select a desired transaction. Actuation of special purpose key may trigger a display of various transaction options on screen 107. A user may select a displayed transaction option by actuating special purpose key 401 again.

Based on the selected transaction(s), corresponding transaction instructions may be formulated by the microprocessor of smart card 400. The formulated transaction instructions may be transmitted to an ATM after smart card 400 establishes a communication channel with the ATM. When the ATM receives the transaction instructions from smart card 400, the ATM autonomously triggers the desired transaction (s) selected by the user.

In some embodiments, special purpose key 401 may include a display screen. The display screen may utilize OLED technology. Each time a user actuates special purpose key 401, the microprocessor may configure the display screen to present a label describing a different transaction or other functionality assigned to special purpose key 401. The user may long-press special purpose key 401 to finally select a displayed transaction option.

For example, each time a user actuates special purpose key 401, the label may describe a different transaction. The user may long-press to select a desired transactions. After a user selects a desired transaction, the label of special purpose key 401 may display a confirmation label. The user may actuate special purpose key 401 to confirm the selected transaction.

Figure 5A:
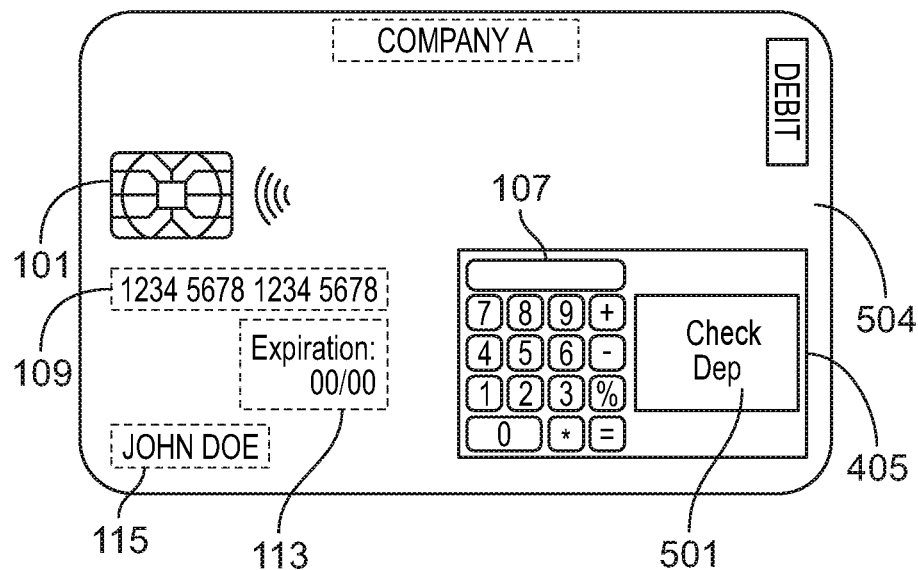
FIG. 5A shows an illustrative apparatus in accordance with principles of the disclosure.

FIG. 5A shows illustrative smart card 500. Smart card 500 may include one or more features of smart cards 100, 200, 300 and 400 (shown in FIGS. 1, 2, 3 and 4). Smart card 500 includes keypad 405, shown in FIG. 4. Keypad 405 includes special purpose key 501. Special purpose key may include one or more features of special purpose key 401 (shown in FIG. 4). Keypad 405 is positioned on face 504 of smart card 500.

Smart card 500 shows that special purpose key 501 may be actuated by a user of smart card 500 to select a check deposit transaction. When a user actuates special purpose key 501, the user may be prompted (e.g., via screen 107) to enter check information. Check information may include a routing number printed on the check, deposit amount and account number printed on a check.

Figure 5B:
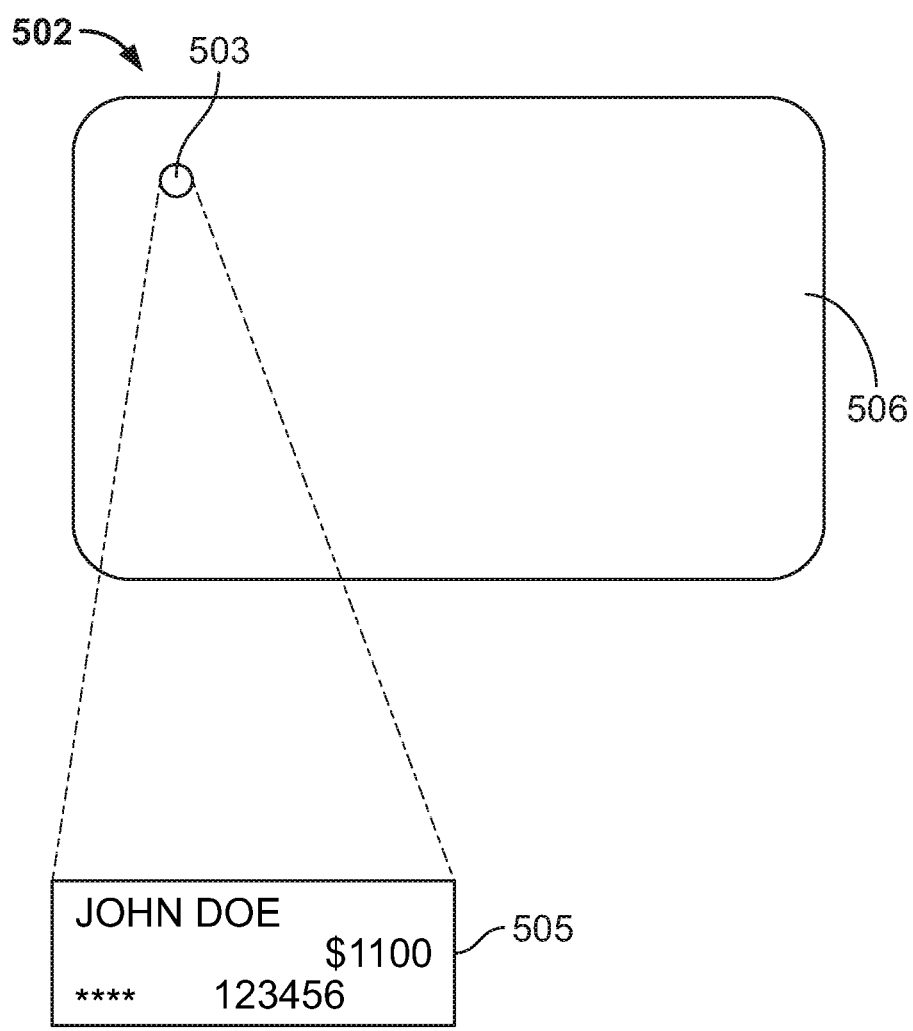
FIG. 5B shows an illustrative apparatus and scenario in accordance with principles of the disclosure.

FIG. 5B shows that face 506 of smart card 500 includes image capturing device 503. Face 506 may be opposing to face 504 (shown in FIG. 5A) of smart card 500. The user of smart card 500 may be instructed (e.g., via screen 107 or an audio message) to position check 505 for being captured by image capture device 503. Image capture device 503 may capture an image of check 505. Image capture device may capture check information associated with check 505. Such information may include a routing number printed on check 505, deposit amount printed on check 505 and account number printed on check 505.

After image capture device 503 captures an image of check 505, the microprocessor may attempt to extract check information from the image. The microprocessor may determine whether the captured check information corresponds to check information entered using keypad 405. The microprocessor may formulate transaction instructions that autonomously trigger a deposit of check 503 when the transaction instructions are transmitted to an ATM.

In some embodiments, image capture device 503 may be used to capture a biometric feature of user. Illustrative biometric features that may be captured by image capture device 503 may include facial features, fingerprints, retina or iris scans. The microprocessor may determine whether to authorize a requested transaction based on the captured biometric feature. For example, before transmitting transaction instructions to an ATM, the microprocessor may determine whether a biometric feature captured by image capture device 503 matches a biometric feature stored locally on smart card 500.

Figure 6:
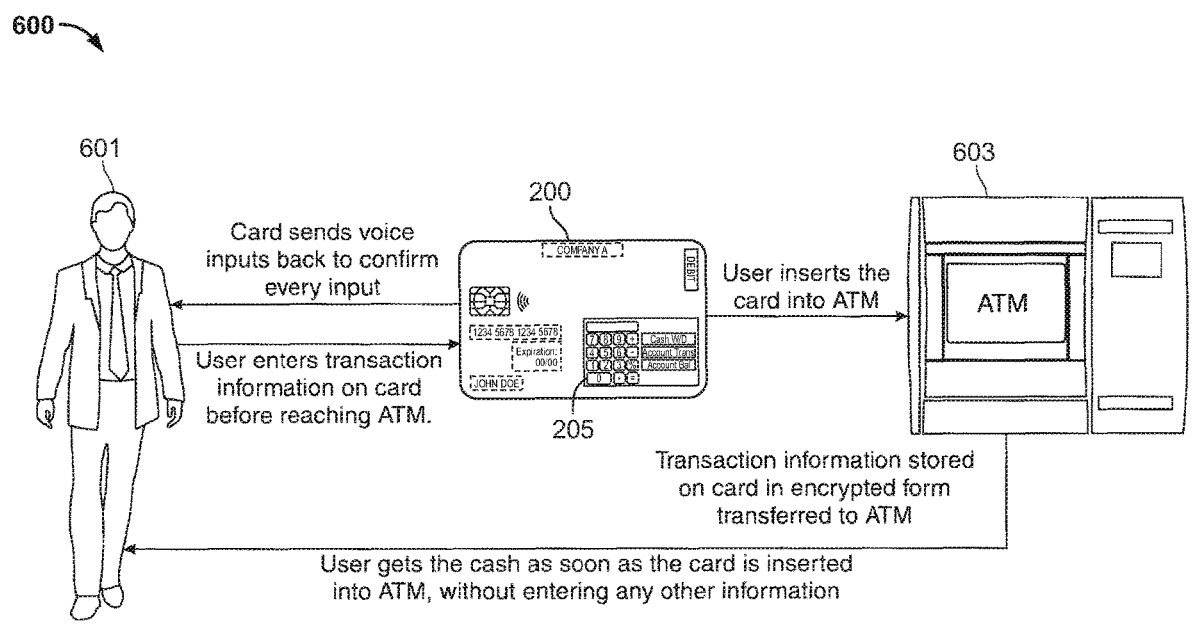
FIG. 6 shows an illustrative apparatus and scenario in accordance with principles of the disclosure.

FIG. 6 shows illustrative scenario 600. In scenario 600, user 601 enters a withdrawal amount and PIN using keypad 205 of smart card 200. The information entered by user 601 may be encrypted and stored locally on smart card 200. Smart card 200 may include a speaker (not shown). The speaker may provide user 601 with audio confirmation of transaction information entered using keypad 205. For example, the speaker may provide audio confirmation of the amount. In some embodiments, to maintain secrecy of a PIN, the speaker may not provide audio confirmation of the PIN.

After entering the amount, PIN, account and any other necessary transaction information, the information is encrypted and stored locally on smart card 200. Smart card 200 may include a specially designed memory location for securely storing transaction information.

In some embodiments, transaction information stored locally on smart card 200 may be transferred to ATM 603. ATM 603 may itself formulate transaction instructions based on the transaction information received from smart card 200. In some embodiments, a microprocessor on smart card 200 may be configured to formulate the transaction instructions executable by ATM 603 based on the transaction information. No external hardware or software such as a mobile device, laptop or desktop device is needed to formulate the transaction instructions. The transaction instructions may also be encrypted and securely stored locally on smart card 200.

The microprocessor of smart card 200 may also purge any locally stored transaction information or instructions that have not been transferred to ATM 603 within a predetermined time window. Transaction information or instructions may be transferred to ATM 603 when smart card 200 is inserted into a card reader (not shown) of ATM 603.

Transaction information or instructions may be transferred wirelessly to ATM 603 when smart card 200 is within a target distance of ATM 603. Smart card 200 may include circuitry for conducting NFC communication. The target distance may correspond to being within range for conducting NFC communication. A typical NFC range is ~2 in.

In other embodiments, the microprocessor of smart card 200 may be configured to dynamically limit or expand wireless transmitting and receiving ranges. The microprocessor may dynamically limit or expand wireless transmitting and receiving ranges in response to detected location of smart card 200.

Smart card 200 may include a global positioning system ("GPS") chip for receiving and/or transmitting GPS signals.

The microprocessor of smart card 200 may determine a current location of the smart card based on the received GPS signals. In other embodiments, the microprocessor of smart card 200 may determine a current location of the smart card based on signal triangulation or information received from an ATM.

After transaction information or instructions stored locally on smart card 200 are transferred to ATM 603, ATM 603 executes the desired transaction based on the received transaction information or instructions. FIG. 6 shows that for a withdrawal transaction (e.g., actuation of special purpose key 201), ATM 603 provides user 601 with the requested amount of cash when smart card 200 is inserted or otherwise establishes communication with ATM 603. User 601 will not have to input any information into ATM 603 or use the screen or keyboard of ATM 603 to receive the desired cash. The process and apparatus shown in FIG. 6 will increase transaction efficiency of ATM 603 by allowing ATM 603 to process more transactions per unit of time.

Figure 7:
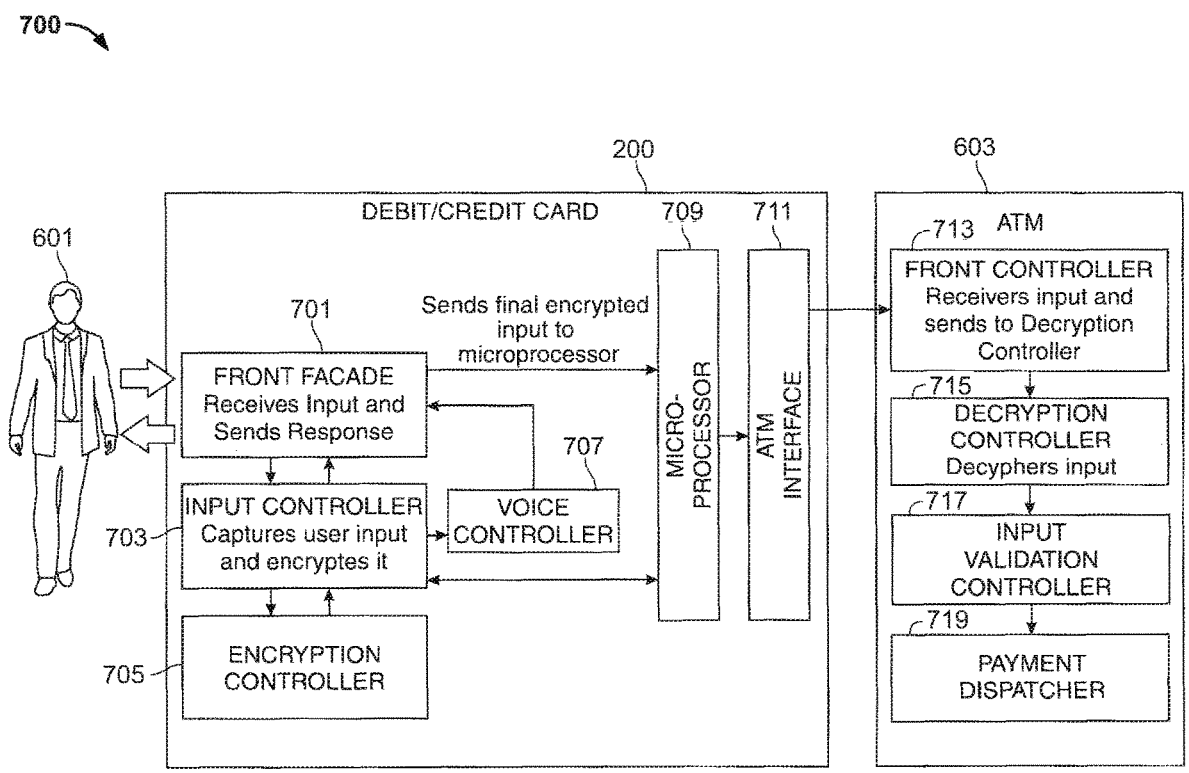
FIG. 7 shows an illustrative apparatus in accordance with principles of the disclosure.

FIG. 7 shows illustrative components 700 of smart card 200 (shown in FIG. 2) and ATM 603 (shown in FIG. 6). FIG. 7 shows that smart card 200 includes front facade 701. Front facade 701 may include keypad 205 and a speaker (not shown) for receiving audio input and providing audio output to user 203. The speaker may be controlled by voice controller 707. Voice controller 707 may receive instructions from input controller 703.

Input controller 703 may capture transaction information input by user 201 using keypad 205. Input controller 703 may encrypt the captured transaction information. Input controller 703 may store captured transaction information locally on smart card 200. Voice controller 707 may generate electrical impulses that when received by the speaker, audibly convey the transaction information captured by input controller 703 to user 601.

Encryption of transaction information captured by input controller 703 may be performed by encryption controller 705. Encryption controller 705 may encrypt transaction information data using any suitable encryption algorithm. Illustrative encryption algorithms include RSA cryptography, Blowfish, AES, RC4, RC5, and RC6.

Smart card 200 may have limited power resources and may utilize an energy efficient encryption algorithm. An illustrative energy efficient encryption algorithm may include RC5, Skipjack and Secure IoT ("SIT").

SIT is a symmetric key algorithm that utilizes a 64-bit block cipher and requires 64-bit key to encrypt data. Typical symmetric key algorithms are designed to take an average of 10 to 20 encryption rounds to maintain a strong encryption process. Each encryption round utilizes mathematical functions to obfuscate data. Generally, the more encryption rounds that are executed, the more secure the algorithm. However, the more encryption rounds that are executed also increases the amount of power consumed by the encryption algorithm.

To minimize power consumption, SIT is limited to just five encryption rounds and each encryption round includes mathematical operations that operate on 4 bits of data. To sufficiently secure the encrypted data, SIT utilizes a Feistel network of substitution diffusion functions such that encryption and decryption operations are very symmetrical. The reduced number of encryption rounds is offset by the relatively long 64 bit key.

Microprocessor 709 may control overall operation of smart card 200 and its associated components. For example, microprocessor 707 may activate or deactivate keypad 205. When keypad 205 is active, input controller 703 may capture and encrypt data input using keypad 205. When keypad 205 is inactive, input controller 703 may not receive data from keypad 205. For example, in the inactive state, power may not be supplied to keypad 205.

In some embodiments, microcontroller may activate or deactivate input controller 703. When active, input controller 703 may capture and encrypt data input using keypad 205. When inactive, input controller 703 may disregard data input using keypad 205.

Microcontroller 709 may activate or deactivate any component of smart card 200. Based on detecting a communication channel associated with ATM 603, microprocessor may activate one or more components of smart card 200. Microprocessor 709 may activate or deactivate components of smart card 200 based on a location of smart card 200. For example, microprocessor 709 may only activate keypad 205 or input controller 703 when smart card 200 is in a familiar zone. User 201 may define a familiar zone by inputting a zip code into keypad 205. Microcontroller 709 may deactivate keypad 205 or input controller 703 when smart card 200 is in an unknown zone. Smart card 200 may include a GPS chip for detecting a current location.

Smart card 200 also includes communication interface 711. Communication interface 711 may include a network interface or adapter. Communication interface 711 may include hardware and/or software for establishing a communication channel with ATM 603. The communication interface may be configured to implement protocols for wireless and/or wired communication with ATM 603.

FIG. 7 also shows illustrative components of ATM 603. ATM 603 includes front controller 713. Front controller 713 communicates with smart card 200 via communication interface 711.

Front controller 713 may include a network interface or adapter. Front controller 713 may include hardware and/or software for establishing a communication channel with smart card 200. Front controller 713 may be configured to implement protocols for wireless and/or wired communication with smart card 200.

Front controller 713 may receive transaction information and instructions transmitted stored on smart card 200 via communication interface 711. Front controller 713 may establish a wired or contact based connection with smart card 200. Front controller 713 may establish a wireless connection with smart card 200. Front controller 713 may include an NFC reader.

Front controller 713 may include a card reader for establishing a wireless connection with smart card 200. Front controller 713 may include circuitry for interacting with chip 101 (shown in FIG. 1) of smart card 200. Front controller 713 may include one or more read heads. The read head(s) may include a plurality of sub-heads that are positioned to extract information encoded on chip 101. The sub-heads may be positioned based on target chip locations as defined in ISO 7816, which is hereby incorporated herein by reference in its entirety.

ATM 603 includes decryption controller 715. Decryption controller 715 may decrypt transaction information/instructions received from smart card 200. The decrypted transaction information/instructions may be passed to input validation controller 717. Input validation controller 717 may connect to a remote computer server to validate authentication credentials or other information included in the transaction information/instructions received from smart card 200.

For example, input validation controller 717 may validate a PIN associated with user 601 and smart card 200. Input validation controller 717 may validate that an account associated with smart card 200 has an adequate balance to withdraw a requested amount included in the transaction information/instructions.

After input validation controller 717 validates the transaction information/instructions, input validation controller 717 may issue instructions to payment dispatcher 719. Payment dispatcher 719 may dispense the amount of cash requested by the transaction information/instructions (received from smart card 200) to user 201. ATM 603 does not require any input from user 201 after establishing communication with smart card 200 and receiving the transaction information/instructions stored on smart card 200.

Figure 8A:
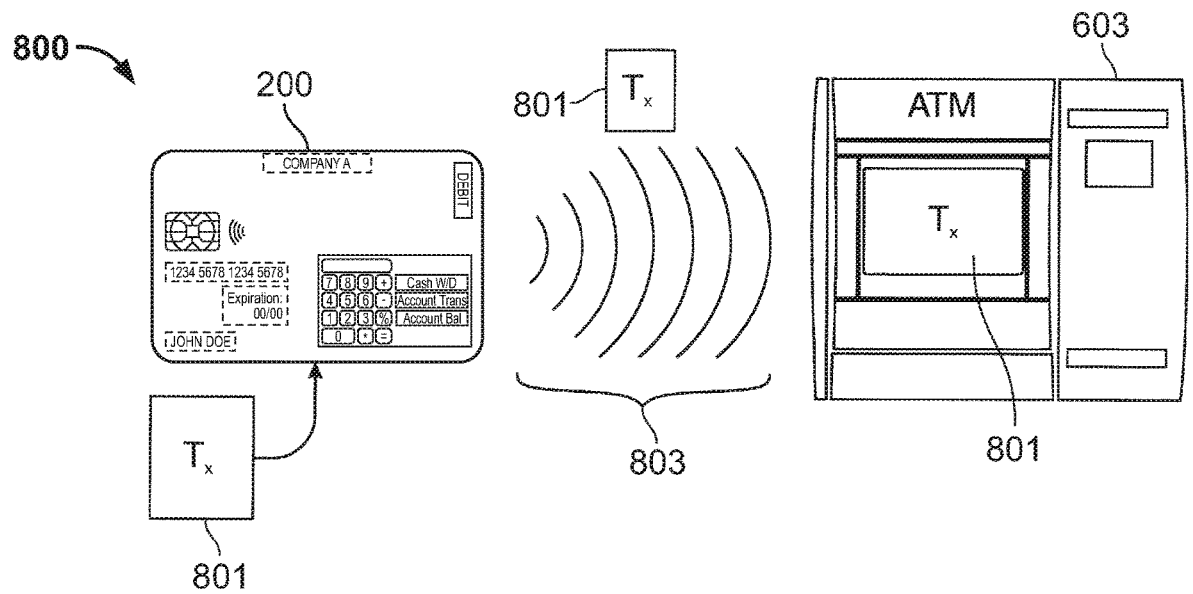
FIG. 8A shows an illustrative apparatus and scenario in accordance with principles of the disclosure.
Figure 8B:
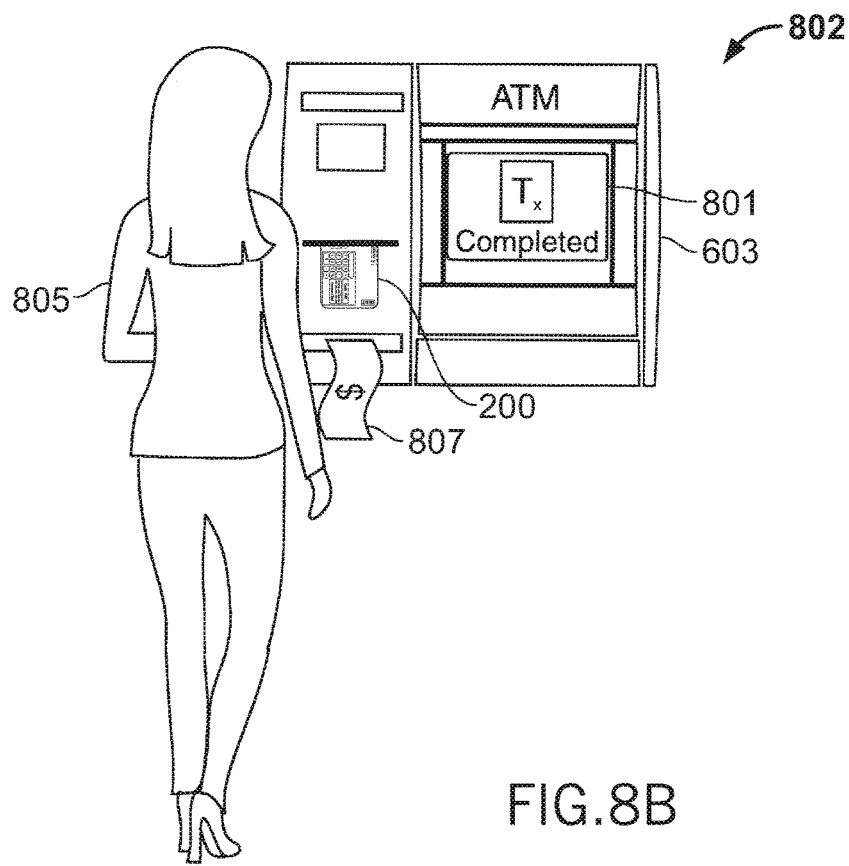
FIG. 8B shows an illustrative apparatus and scenario in accordance with principles of the disclosure.

FIGS. 8A-8B show illustrative scenarios 800 and 802. In scenario 800, user 805 has utilized keypad 205 of smart card 200 to enter transaction information that is stored locally on smart card 200. Based on the entered transaction information, smart card 200 may formulate transaction instructions that are executable by ATM 603. Formulated transaction instructions are stored on smart card 200 as transaction instructions 801.

Scenario 800 shows that smart card 200 and ATM 603 communicate using wireless communication channel 803. Communication channel 803 may be established when smart card is within a threshold distance of ATM 603. For example, communication channel 803 may be an NFC channel established when smart card 200 and ATM 603 are within a close proximity of each other.

In other embodiments, communication channel 803 may be a Wi-Fi communication channel. For example, user 805 may enter the transaction information from a comfort of their home. User 805 may pass ATM 603 on the way to or home from work. Using a wireless network at home or work, user 805 may initiate a transfer of transaction instructions 801 to ATM 603.

Transaction instructions 801 are transferred over communication channel 803 to ATM 603. Scenario 800 shows that communication channel 803 is a wireless communication channel. In other embodiments, communication channel may be a wired or contact based communication channel.

FIG. 8B shows scenario 802. In scenario 802, user 805 has inserted smart card 200 into a card reader of ATM 603. As discussed above, user 805 may have transferred transaction instructions 801 specifically to ATM 603 because ATM 603 is at a convenient location.

In other embodiments, transaction instructions may be transferred to a cloud computing system. When smart card 200 is inserted into ATM 603, ATM 603 may request any transaction instructions associated with smart card 200 and stored in the cloud computing system.

Transaction instructions 801 may include timing restrictions. The timing restrictions may limit execution of transaction instructions 801 to a time window defined by the timing restrictions. If transaction instructions 801 are not executed within the time window, smart card 200 and/or ATM 603 may delete transaction instructions 801. If transaction instructions 801 are not executed within the time window, smart card 200 may delete transaction instructions 801.

In scenario 802, user 805 inserts smart card 200 into ATM 603. ATM 603 recognizes, based on the information stored on smart card 200, that transaction instructions 801 are associated with smart card 200. ATM 603 may recognize that transaction instructions 801 are associated with smart card 200 based on data encoded in an EMV chip or magnetic stripe of smart card 200. In some embodiments, when smart card 200 is inserted into ATM 603, smart card 200 may inform ATM 603 that transaction instructions 801 stored locally on smart card 200 are ready to be executed by ATM 603.

Scenario 802 shows ATM 603 dispensing cash 807 to user 805. The amount of cash 807 is defined by transaction instructions 801. In scenario 802, ATM 603 dispenses cash 807 to user 805 without user 805 entering any data at ATM 603.

Figure 9B:
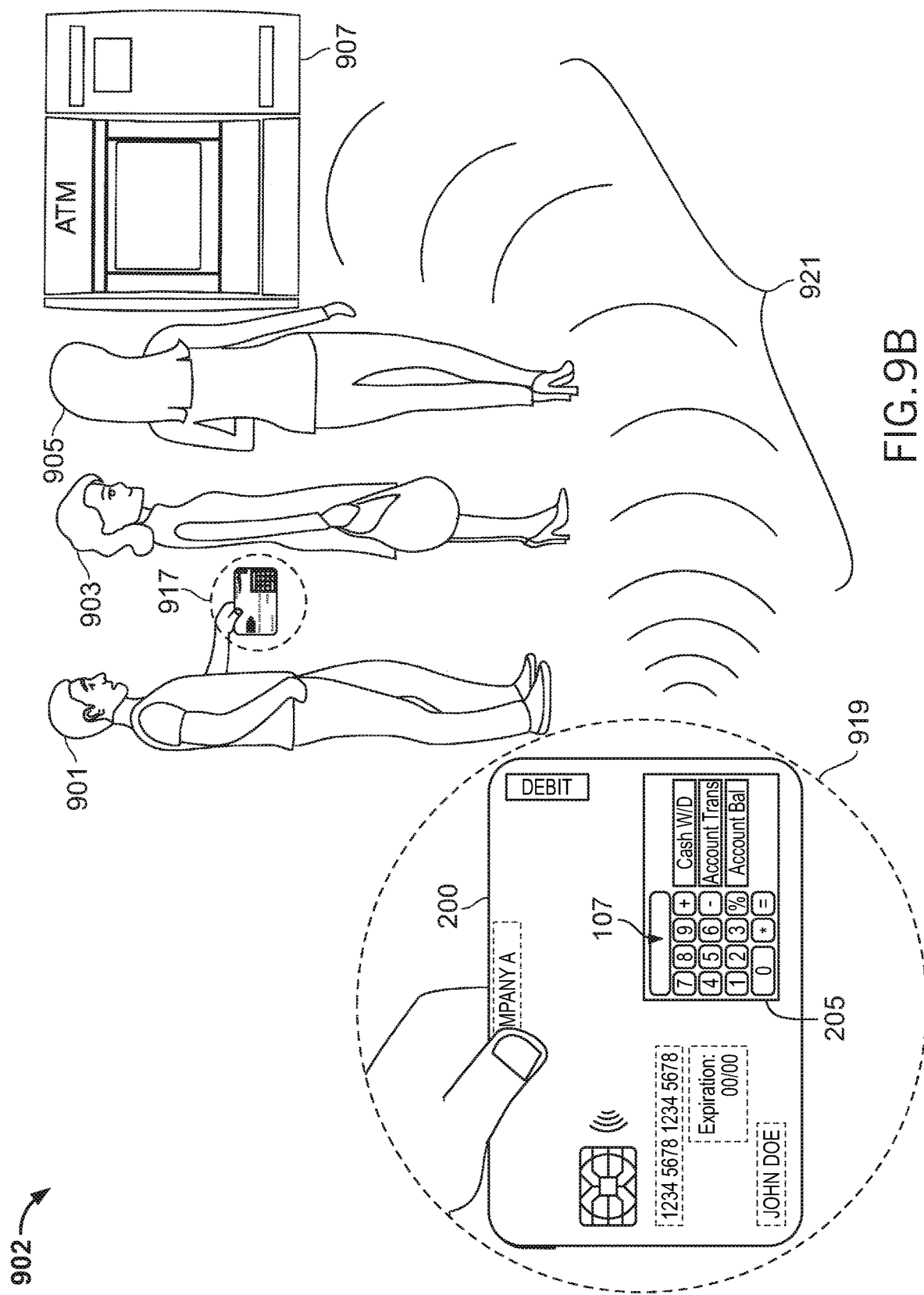
FIG. 9B shows an illustrative apparatus and scenario in accordance with principles of the disclosure.

FIGS. 9A and 9B show illustrative scenarios 900 and 902. FIG. 9A shows scenario 900. In scenario 900, users 901, 903 and 905 are all waiting on a line to use ATM 907. Scenario 901 shows that user 901 is last on the line. Scenario 900 also shows that user 901 is in possession of smart card 200.

Enlarged view 911 of smart card 200 shows that keypad 205 of smart card 200 is in inactive state 913 and is locked. When keypad 205 is inactive, information may not be entered using keypad 205. When keypad 205 is inactive, information entered using keypad 205 may not be stored on smart card 200. In some embodiments, keypad 205 may remain locked until smart card 200 detects that it is within range of a communication channel of ATM 907.

FIG. 9B shows scenario 902. In scenario 902, while user 901 is waiting on the line, smart card 200 determines it is within range of a communication channel of ATM 907. Smart card 200 establishes communication channel 921 with ATM 907. In response to establishing communication channel 921, microprocessor 309 (shown in FIG. 3) unlocks keypad 205. As shown in 917, user 901 may remove smart card 200 and enter transaction information while waiting for users 903 and 905 to complete their transactions at ATM 907.

Enlarged view 919 shows that smart card 200 is now unlocked. When unlocked, transaction information may now be entered by user 901 while waiting on the line. Using unlocked keypad 205, user 901 may enter an amount such as $345. Using unlocked keypad 205, user 901 may enter a PIN. The entered PIN may be represented by "xxxx" when displayed on screen 107 to prevent an onlooker from viewing the PIN entered by user 901. User 901 may a actuate special purpose key 201 to indicate that the transaction information is for a withdrawal transaction.

Transaction information entered by user 901 may be stored locally on smart card 200. Transaction information entered by user 901 may be transferred to ATM 907 while user 901 is waiting on the line to access ATM 907. When user 901 inserts smart card 200 into ATM 907, transaction information previously entered by user 901 is used to execute a transaction at ATM 907. The transaction may be executed without requiring any inputs from user 901 after smart card 200 was inserted into ATM 907.

Executing transactions based on transaction information previously entered by user 901 may increase a transaction efficiency of ATM 907. For example, each of users 903 and 905 may be in possession of a smart card such as smart card 200. Each of users 903 and 905 may enter transaction information using keypad 205 before approaching ATM 907.

Based on the previously entered transaction information, transactions desired by each of users 903 and 905 may be executed by ATM 907 solely based on communication with smart card 200. The desired transactions may be executed without requiring any additional prompts or inputs from users 903 or 905 after their respective smart cards are inserted into ATM 907.

As a result of not having to prompt users 901, 903 or 905 for information, ATM 907 may process transactions desired by users 901, 903 or 905 in less time. Accordingly, users

901, 903 or 905 each wait less time on the line before having their desired transactions executed by ATM 907.

Figure 10:
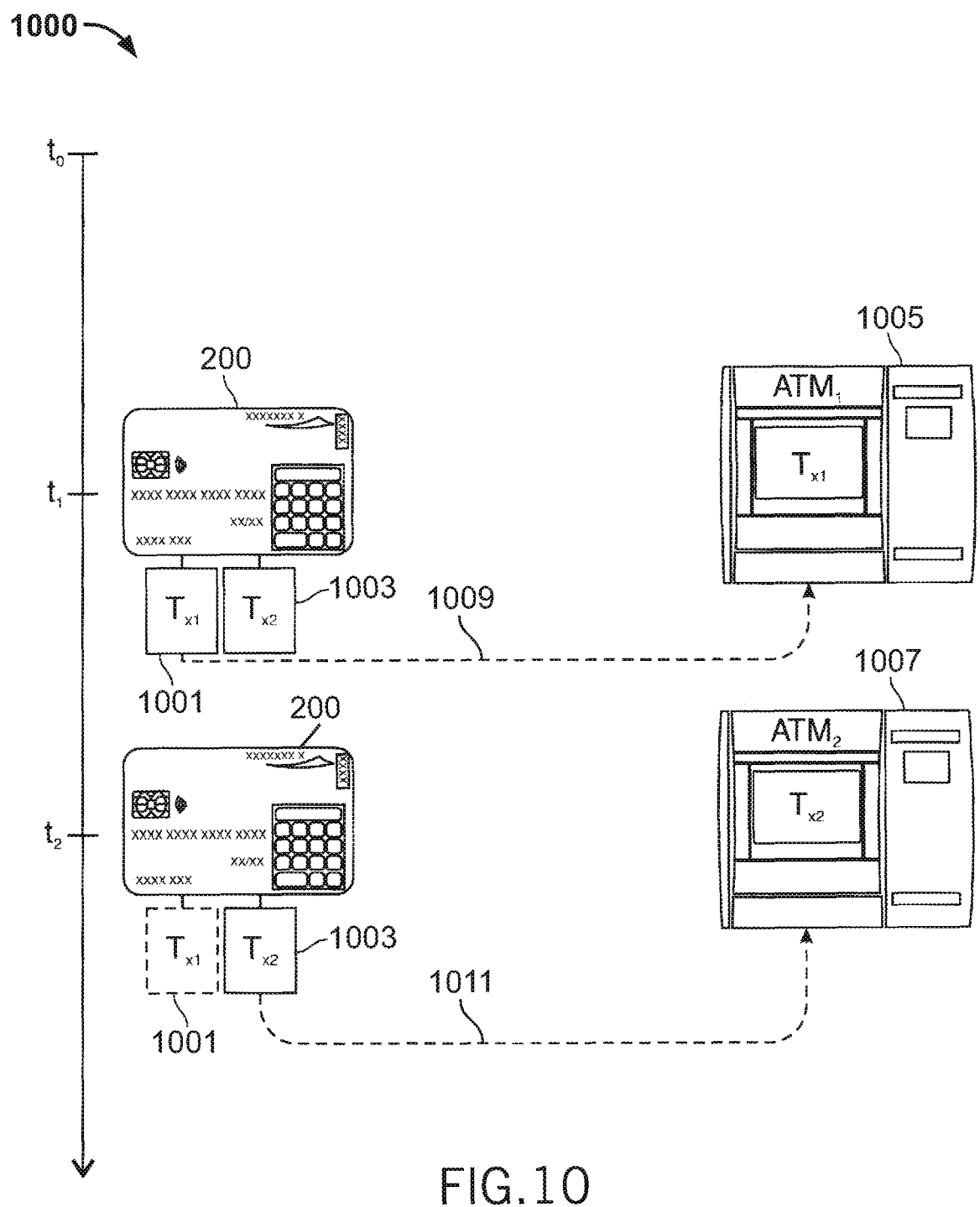
FIG. 10 shows an illustrative apparatus and scenario in accordance with principles of the disclosure.

FIG. 10 shows illustrative scenario 1000. In scenario 1000, at time $t_1$, smart card 200 locally stores two desired transactions—1001 and 1003. Each of transactions 1001 and 1003 may be associated with timing restrictions. Each of transactions 1001 and 1003 may be associated with location restrictions. For example, the user may limit transaction 1001 to being executed at $t_1$ at ATM 1005. The user may limit transaction 1003 to being executed at $t_2$ at ATM 1007.

Scenario 1000 shows that at $t_1$, transaction 1001 is transferred to ATM 1005 via communication channel 1009 for execution. Scenario 1000 shows that at $t_2$, transaction 1003 is transferred to ATM 1007 via communication channel 1011 for execution. At $t_2$, because transaction 1001 has already been transferred to ATM 1005 at $t_1$, transaction 1001 is shown in phantom lines on smart card 200.

In some embodiments, transaction 1001 may be deleted from smart card 200 after being transferred to ATM 1005. For example, ATM 1005 may issue an instruction to smart card 200 to delete transaction 1001 after ATM 1005 successfully executes transaction 1001.

Thus, methods and apparatus for SPECIALIZED KEYPAD FOR PRE-STAGING COMPLEX TRANSACTIONS are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for improving transaction processing efficiency of an Automated Teller Machine ("ATM"), the system comprising a smart card having a thickness not greater than 0.8 mm and a surface area not greater than 86 mm×54 mm and the smart card comprising:
   a communication interface comprising a wireless communication circuit and a contact-based communication circuit;
   a microprocessor;
   a user input system in electronic communication with the microprocessor, the user input system comprising:
      a keypad comprising a first special purpose key and a second special purpose key;
      an input controller that captures data entered using the keypad, including a first actuation of the first special purpose key, a first actuation of the first special purpose key and actuation of the second special purpose key;
      a voice controller that generates an audio message confirming formulation of first target transaction instructions triggered by the first actuation of the first special purpose key when the smart card is more than a threshold distance away from the ATM, the first target transaction instructions corresponding to a first desired transaction; and
      an encryption controller that encrypts the data captured by the input controller; and
   executable instructions stored in a non-transitory memory, that when run by the microprocessor:
      in response to the actuation of the second special purpose key:
         scan for and detect a wireless ATM communication channel;
         conduct secure wireless communication with the ATM over the wireless ATM communication channel using the communication interface and authenticate the smart card at the ATM utilizing authentication information stored locally on the smart card; and
         transfer the first target transaction instructions from the smart card to the ATM over the wireless ATM communication channel before the smart card is inserted into the ATM and initiate pre-processing of the first target transaction instructions at the ATM before the smart card is inserted into the ATM;
      in response to detecting the second actuation of the first special purpose key, formulate second target transaction instructions; and
      in response to determining that the that smart card is less than a threshold distance away from the ATM, that a current time is within a window defined by the first target transaction instructions, and detecting that the smart card has been inserted into the ATM and established a contact-based communication channel with the ATM, automatically trigger sequential execution of the first and second target transaction instructions without prompting the user for any additional inputs at the ATM.

2. The system of claim 1 wherein the executable instructions stored in the non-transitory memory, when run by the microprocessor:
   formulate the first target transaction instructions corresponding to a cash withdrawal or a bill payment in response to detecting the first actuation of the first special purpose key within a predetermined interval; and
   formulate the second target transaction instructions corresponding to an account transfer in response to detecting the second actuation of the first special purpose key within the predetermined interval.

3. The system of claim 1 wherein the executable instructions stored in the non-transitory memory, when run by the microprocessor, formulate the first target transaction instructions corresponding to an account balance in response to detecting a long-press of the first special purpose key during a predetermined interval.

4. The system of claim 1 wherein the executable instructions, when run by the microprocessor, delete the second target transaction instructions from the smart card when the first target transaction instructions are not executed within a pre-determined time period.

5. The system of claim 1 wherein:
   the ATM is a first ATM; and
   the executable instructions, when run by the microprocessor:
      trigger execution of the first target transaction instructions at the first ATM; and
      trigger execution of the second target transaction instructions at a second ATM after successful execution of the first target transaction instructions at the first ATM.

6. A system for improving transaction processing efficiency of an Automated Teller Machine ("ATM"), the system comprising a smart card having a thickness not greater than 0.8 mm and a surface area not greater than 86 mm×54 mm and the smart card comprising:
   a communication interface;
   a microprocessor;
   a user input system in electronic communication with the microprocessor, the user input system comprising:
      a keypad comprising a first special purpose key and a second special purpose key;

an input controller that captures data entered using the keypad, including a first actuation of the first special purpose key, a second actuation of the first special purpose key and actuation of a second special purpose key;

a voice controller that generates an audio message confirming formulation of first target transaction instructions triggered by the first actuation of the first special purpose key; and an encryption controller that encrypts the data captured by the input controller; and executable instructions stored in a non-transitory memory, that when run by the microprocessor:

formulate the first target transaction instructions in response to detecting the first actuation of the first special purpose key;

formulate second target transaction instructions in response to detecting the second actuation of the first special purpose key;

in response to the actuation of the second special purpose key, determine that the smart card is more than a threshold distance away from the ATM and then, authenticate the smart card at the ATM and establish a secure communication channel with the ATM using the communication interface;

determine that the smart card is less than a threshold distance away from the ATM and then, transfer the first target transaction instructions from the smart card to the ATM over the secure communication channel; and after the smart card is inserted into the ATM and establishes a contact-based communication channel with the ATM, automatically trigger sequential execution of the first and the second target transaction instructions without prompting the user for any additional inputs at the ATM;

wherein each special purpose key comprises:

a button; and an organic light emitting diode ("OLED") display having a thickness not greater than 0.25 mm.

7. The system of claim 6 wherein the executable instructions stored in the non-transitory memory, when run by the microprocessor:

formulate the first target transaction instructions corresponding to a cash withdrawal or a bill payment in response to detecting the first actuation of the first special purpose key within a predetermined interval;

formulate the second target transaction instructions corresponding to an account transfer in response to detecting the second actuation of the first special purpose key within the predetermined interval.

8. The system of claim 6 wherein the executable instructions stored in the non-transitory memory, when run by the microprocessor, formulate the first target transaction instructions corresponding to an account balance in response to detecting a long-press of the first special purpose key during a predetermined interval.

9. The system of claim 6 wherein the executable instructions, when run by the microprocessor, delete the second target transaction instructions from the smart card when the first target transaction instructions are not executed within a pre-determined time period.

10. The system of claim 6 wherein:

the ATM is a first ATM; and the executable instructions, when run by the microprocessor:

trigger execution of the first target transaction instructions at the first ATM; and trigger execution of the second target transaction instructions at a second ATM after successful execution of the first target transaction instructions at the first ATM.

11. The system of claim 6 wherein each OLED display is configurable to display a label describing a specific transaction assigned to each special purpose key.

* * * * *